(12) United States Patent
Cross, Jr. et al.

(10) Patent No.: US 8,725,513 B2
(45) Date of Patent: May 13, 2014

(54) PROVIDING EXPRESSIVE USER INTERACTION WITH A MULTIMODAL APPLICATION

(75) Inventors: Charles W. Cross, Jr., Wellington, FL (US); Ellen M. Eide, Tarrytown, NY (US); Igor R. Jablokov, Charlotte, NC (US)

(73) Assignee: Nuance Communications, Inc., Burlington, MA (US)

(*) Notice: Subject to any disclaimer, the term of this patent is extended or adjusted under 35 U.S.C. 154(b) by 1908 days.

(21) Appl. No.: 11/734,422

(22) Filed: Apr. 12, 2007

(65) Prior Publication Data

US 2008/0255850 A1    Oct. 16, 2008

(51) Int. Cl.
| | |
|---|---|
| G06F 17/27 | (2006.01) |
| G10L 15/00 | (2013.01) |
| G10L 13/00 | (2006.01) |
| G10L 25/00 | (2013.01) |
| H04M 1/64 | (2006.01) |
| H04M 11/00 | (2006.01) |
| G06F 3/01 | (2006.01) |
| G06F 3/18 | (2006.01) |

(52) U.S. Cl.
USPC ........... 704/270; 704/258; 704/260; 704/231; 704/235; 704/251; 704/257; 704/270.1; 704/275; 704/9; 715/256; 715/273; 715/275; 715/700; 715/727; 715/728; 379/88.01; 379/88.16

(58) Field of Classification Search
CPC ....... G10L 13/00; G10L 13/02; G10L 13/027; G10L 13/08; G10L 15/00; G10L 15/22; G10L 15/26; G10L 15/265; G10L 25/63
USPC .............. 704/258, 261, 270.1, 275, 231, 235, 704/251, 252, 257, 270
See application file for complete search history.

(56) References Cited

U.S. PATENT DOCUMENTS

| | | | |
|---|---|---|---|
| 5,577,165 | A | 11/1996 | Takebayashi et al. |
| 5,584,052 | A | 12/1996 | Galau et al. |

(Continued)

FOREIGN PATENT DOCUMENTS

| | | |
|---|---|---|
| CN | 1385783 | 12/2002 |
| CN | 1385783 A | 12/2002 |

(Continued)

OTHER PUBLICATIONS

T. Rosenberger, R. L. Mac-Neil, Prosodic Font:Translating Speech intographics, Proceedings of CHI'99 Extended Abstracts, Pittsburgh, May 1999, pp. 252-253.*

(Continued)

*Primary Examiner* — Paras D Shah
(74) *Attorney, Agent, or Firm* — Wolf, Greenfield & Sacks, P.C.

(57) ABSTRACT

Methods, apparatus, and products are disclosed for providing expressive user interaction with a multimodal application, the multimodal application operating in a multimodal browser on a multimodal device supporting multiple modes of user interaction including a voice mode and one or more non-voice modes, the multimodal application operatively coupled to a speech engine through a VoiceXML interpreter, including: receiving, by the multimodal browser, user input from a user through a particular mode of user interaction; determining, by the multimodal browser, user output for the user in dependence upon the user input; determining, by the multimodal browser, a style for the user output in dependence upon the user input, the style specifying expressive output characteristics for at least one other mode of user interaction; and rendering, by the multimodal browser, the user output in dependence upon the style.

20 Claims, 6 Drawing Sheets

(56) References Cited

U.S. PATENT DOCUMENTS

| | | | |
|---|---|---|---|
| 5,969,717 A | 10/1999 | Ikemoto | |
| 6,175,820 B1* | 1/2001 | Dietz | 704/235 |
| 6,208,972 B1 | 3/2001 | Grant et al. | |
| 6,243,375 B1 | 6/2001 | Speicher | |
| 6,275,806 B1 | 8/2001 | Pertrushin | |
| 6,301,560 B1 | 10/2001 | Masters | |
| 6,334,106 B1* | 12/2001 | Mizuno et al. | 704/260 |
| 6,446,040 B1* | 9/2002 | Socher et al. | 704/260 |
| 6,513,011 B1 | 1/2003 | Uwakubo | |
| 6,606,599 B2 | 8/2003 | Grant et al. | |
| 6,785,649 B1* | 8/2004 | Hoory et al. | 704/235 |
| 6,856,960 B1 | 2/2005 | Dragosh et al. | |
| 6,912,581 B2* | 6/2005 | Johnson et al. | 709/228 |
| 6,920,425 B1 | 7/2005 | Will et al. | |
| 6,983,307 B2* | 1/2006 | Mumick et al. | 709/205 |
| 6,999,930 B1 | 2/2006 | Roberts et al. | |
| 7,035,805 B1 | 4/2006 | Miller | |
| 7,096,183 B2* | 8/2006 | Junqua | 704/258 |
| 7,150,399 B2 | 12/2006 | Barrus et al. | |
| 7,171,243 B2 | 1/2007 | Watanabe et al. | |
| 7,188,067 B2 | 3/2007 | Grant et al. | |
| 7,257,575 B1* | 8/2007 | Johnston et al. | 1/1 |
| 7,272,212 B2* | 9/2007 | Eberle et al. | 379/88.17 |
| 7,330,890 B1 | 2/2008 | Partovi et al. | |
| 7,376,586 B1 | 5/2008 | Partovi et al. | |
| 7,487,085 B2 | 2/2009 | Cross et al. | |
| 7,490,042 B2* | 2/2009 | Eide et al. | 704/270 |
| 7,599,838 B2* | 10/2009 | Gong et al. | 704/258 |
| 7,792,673 B2* | 9/2010 | Oh et al. | 704/260 |
| 8,234,118 B2* | 7/2012 | Pyo et al. | 704/270.1 |
| 8,543,704 B2 | 9/2013 | Bowater et al. | |
| 2002/0065944 A1 | 5/2002 | Hickey et al. | |
| 2002/0092019 A1 | 7/2002 | Marcus | |
| 2002/0099553 A1 | 7/2002 | Brittan et al. | |
| 2002/0120554 A1 | 8/2002 | Vega | |
| 2002/0147593 A1 | 10/2002 | Lewis et al. | |
| 2002/0184610 A1 | 12/2002 | Chong et al. | |
| 2003/0039341 A1 | 2/2003 | Burg et al. | |
| 2003/0046316 A1 | 3/2003 | Gergic et al. | |
| 2003/0046346 A1 | 3/2003 | Mumick et al. | |
| 2003/0101451 A1 | 5/2003 | Bentolila et al. | |
| 2003/0125945 A1 | 7/2003 | Doyle | |
| 2003/0179865 A1 | 9/2003 | Stillman et al. | |
| 2003/0182622 A1 | 9/2003 | Sibal et al. | |
| 2003/0187656 A1* | 10/2003 | Goose et al. | 704/270.1 |
| 2003/0195739 A1 | 10/2003 | Washio | |
| 2003/0217161 A1 | 11/2003 | Balasuriya | |
| 2003/0229900 A1 | 12/2003 | Reisman | |
| 2003/0235282 A1 | 12/2003 | Sichelman et al. | |
| 2004/0019487 A1 | 1/2004 | Kleindienst et al. | |
| 2004/0025115 A1 | 2/2004 | Seinel et al. | |
| 2004/0031058 A1 | 2/2004 | Reisman | |
| 2004/0044516 A1 | 3/2004 | Kennewick et al. | |
| 2004/0049390 A1* | 3/2004 | Brittan et al. | 704/270.1 |
| 2004/0059705 A1 | 3/2004 | Wittke et al. | |
| 2004/0083109 A1 | 4/2004 | Halonen et al. | |
| 2004/0120472 A1 | 6/2004 | Popay et al. | |
| 2004/0120476 A1 | 6/2004 | Harrison et al. | |
| 2004/0138890 A1 | 7/2004 | Ferrans et al. | |
| 2004/0153323 A1 | 8/2004 | Charney et al. | |
| 2004/0179038 A1 | 9/2004 | Blattner et al. | |
| 2004/0216036 A1 | 10/2004 | Chu et al. | |
| 2004/0236574 A1 | 11/2004 | Ativanichayaphong et al. | |
| 2004/0260562 A1 | 12/2004 | Kujirai | |
| 2005/0075884 A1 | 4/2005 | Badt, Jr. | |
| 2005/0091059 A1 | 4/2005 | Lecoeuche | |
| 2005/0131701 A1 | 6/2005 | Cross | |
| 2005/0138219 A1 | 6/2005 | Boughannam | |
| 2005/0138647 A1 | 6/2005 | Boughannam | |
| 2005/0154580 A1 | 7/2005 | Horowitz et al. | |
| 2005/0160461 A1 | 7/2005 | Baumgartner et al. | |
| 2005/1888412 | 8/2005 | Dacosta | |
| 2005/0203729 A1 | 9/2005 | Roth et al. | |
| 2005/0203747 A1 | 9/2005 | Lecoeuche | |
| 2005/0261908 A1 | 11/2005 | Cross | |
| 2005/0273769 A1 | 12/2005 | Eichenberger et al. | |
| 2005/0283367 A1 | 12/2005 | Cross | |
| 2006/0047510 A1 | 3/2006 | Cross | |
| 2006/0064302 A1 | 3/2006 | Cross | |
| 2006/0069564 A1 | 3/2006 | Allison et al. | |
| 2006/0074680 A1 | 4/2006 | Cross | |
| 2006/0075120 A1 | 4/2006 | Smit | |
| 2006/0106618 A1* | 5/2006 | Racovolis et al. | 704/277 |
| 2006/0111906 A1 | 5/2006 | Cross | |
| 2006/0122836 A1 | 6/2006 | Cross, Jr. et al. | |
| 2006/0123358 A1 | 6/2006 | Lee et al. | |
| 2006/0136222 A1 | 6/2006 | Cross | |
| 2006/0146728 A1 | 7/2006 | Engelsma et al. | |
| 2006/0168095 A1 | 7/2006 | Sharma et al. | |
| 2006/0168595 A1 | 7/2006 | McArdle | |
| 2006/0184626 A1 | 8/2006 | Agapi | |
| 2006/0190264 A1 | 8/2006 | Jaramillo | |
| 2006/0218039 A1 | 9/2006 | Johnson | |
| 2006/0229880 A1 | 10/2006 | White | |
| 2006/0235694 A1 | 10/2006 | Cross | |
| 2006/0287845 A1 | 12/2006 | Cross et al. | |
| 2006/0287865 A1 | 12/2006 | Cross et al. | |
| 2006/0287866 A1 | 12/2006 | Cross et al. | |
| 2006/0288309 A1 | 12/2006 | Cross et al. | |
| 2007/0061401 A1* | 3/2007 | Bodin et al. | 709/206 |
| 2007/0100628 A1* | 5/2007 | Bodin et al. | 704/261 |
| 2007/0100631 A1* | 5/2007 | Bodin et al. | 704/270 |
| 2007/0265851 A1 | 11/2007 | Cross et al. | |
| 2007/0274296 A1 | 11/2007 | Cross et al. | |
| 2007/0274297 A1 | 11/2007 | Cross et al. | |
| 2007/0288241 A1 | 12/2007 | Cross et al. | |
| 2007/0294084 A1 | 12/2007 | Cross et al. | |
| 2008/0065386 A1 | 3/2008 | Cross et al. | |
| 2008/0065387 A1 | 3/2008 | Cross et al. | |
| 2008/0065388 A1 | 3/2008 | Cross et al. | |
| 2008/0065389 A1 | 3/2008 | Cross et al. | |
| 2008/0065390 A1 | 3/2008 | Ativanichayaphong et al. | |
| 2008/0086303 A1* | 4/2008 | Sengamedu | 704/231 |
| 2008/0086564 A1 | 4/2008 | Putman et al. | |
| 2008/0140410 A1 | 6/2008 | Cross et al. | |
| 2008/0162136 A1 | 7/2008 | Ativanichayaphong et al. | |
| 2008/0177530 A1 | 7/2008 | Cross et al. | |
| 2008/0195393 A1 | 8/2008 | Cross et al. | |
| 2008/0208584 A1 | 8/2008 | Cross et al. | |
| 2008/0208585 A1 | 8/2008 | Ativanichayaphong et al. | |
| 2008/0208586 A1 | 8/2008 | Ativanichayaphong et al. | |
| 2008/0208587 A1 | 8/2008 | Cross et al. | |
| 2008/0208588 A1 | 8/2008 | Cross et al. | |
| 2008/0208589 A1 | 8/2008 | Cross et al. | |
| 2008/0208590 A1 | 8/2008 | Cross et al. | |
| 2008/0208591 A1 | 8/2008 | Ativanichayaphong et al. | |
| 2008/0208592 A1 | 8/2008 | Cross et al. | |
| 2008/0208593 A1 | 8/2008 | Ativanichayaphong et al. | |
| 2008/0208594 A1 | 8/2008 | Cross et al. | |
| 2008/0228494 A1 | 9/2008 | Cross et al. | |
| 2008/0228495 A1 | 9/2008 | Cross et al. | |
| 2008/0235021 A1 | 9/2008 | Cross et al. | |
| 2008/0235022 A1 | 9/2008 | Cross et al. | |
| 2008/0235024 A1* | 9/2008 | Goldberg et al. | 704/260 |
| 2008/0235027 A1 | 9/2008 | Cross | |
| 2008/0235029 A1 | 9/2008 | Cross et al. | |
| 2008/0249782 A1 | 10/2008 | Ativanichayaphong et al. | |
| 2008/0255850 A1 | 10/2008 | Cross et al. | |
| 2008/0255851 A1 | 10/2008 | Cross et al. | |
| 2012/0044183 A1* | 2/2012 | Faisman et al. | 345/173 |

FOREIGN PATENT DOCUMENTS

| | | |
|---|---|---|
| CN | 1564123 A | 1/2005 |
| EP | 0794670 A | 9/1997 |
| EP | 1450350 | 8/2004 |
| JP | 2000155529 A | 6/2000 |
| JP | 02003140672 A | 5/2003 |
| WO | WO 99/48088 | 9/1999 |
| WO | WO 0051106 A | 8/2000 |

(56) References Cited

FOREIGN PATENT DOCUMENTS

| WO | WO 02/32140 A | 4/2002 |
|---|---|---|
| WO | WO 2004/062945 A | 7/2004 |
| WO | WO2006108795 | 10/2006 |

OTHER PUBLICATIONS

Truillet, Philippe, et al. "Effect of Sound Fonts in an Aural Presentation." 6th ERCIM Workshop, UI4ALL. 2000.*
U.S. Appl. No. 10/924,520, filed Aug. 24, 2004, Charles W. Cross, Jr.
U.S. Appl. No. 10/945,112, filed Sep. 20, 2004, Charles W. Cross, Jr.
U.S. Appl. No. 10/870,517, filed Jun. 17, 2004, Charles W. Cross, Jr.
U.S. Appl. No. 10/441,839, filed May 20, 2003, S. Ativanichayaphong.
U.S. Appl. No. 11/062,731, filed Feb. 22, 2005, David Jaramillo.
U.S. Appl. No. 11/007,830, filed Dec. 8, 2004, Charles W. Cross, Jr.
U.S. Appl. No. 10/945,119, filed Sep. 20, 2004, Charles W. Cross, Jr.
U.S. Appl. No. 11/022,464, filed Dec. 22, 2004, Charles W. Cross, Jr.
U.S. Appl. No. 10/741,997, filed Dec. 19, 2003, Akram Boughannam.
U.S. Appl. No. 10/741,499, filed Dec. 19, 2003, Akram Boughannam.
U.S. Appl. No. 11/056,493, filed Feb. 11, 2005, Ciprian Agapi.
U.S. Appl. No. 11/093,545, filed Mar. 30, 2005 Marc White.
U.S. Appl. No. 11/105,865, filed Apr. 14, 2005, Charles W. Cross, Jr.
U.S. Appl. No. 10/849,642, filed May 19, 2004, Charles W. Cross, Jr.
U.S. Appl. No. 10/992,979, filed Nov. 19, 2004, Charles W. Cross, Jr.
U.S. Appl. No. 10/733,610, filed Dec. 11, 2003, Charles W. Cross, Jr.
Axelsson, et al.; "XHTML+Voice Profile 1.2" Internet, [Online] Mar. 16, 2004 Mar. 6, 2004, pp. 1-53, XP002484188 Retrieved from the Internet: URL: http://www.voicexml.org/specs/mutlimodal/x+v/12/spec.html [retrieved on Jun. 12, 2008 ].
W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2009].
W3C: "Voice Extensible Markup Language (VoiceXML) 2.1, W3C Candidate Recommendation Jun. 13, 2005" Internet, [Online] Jun. 13, 2005 (2005-16-13), pp. 1-34, XP002484189 Retrieved from the Internet: URL:http://www.w3.org/TR/2005/CR-voicexml21-20050613/ [retrieved on Jun. 12, 2008].
PCT Search Report, Jun. 25, 2008; PCT Application No. ; PCT/EP2008/051358.
PCT Search Report, Jun. 18, 2008; PCT Application No. ; PCT/EP2008/051363.
Didier Guillevic, et al.,Robust Semantic Confidence Scoring ICSLP 2002: 7$^{th}$ International Conference On Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.
U.S. Appl. No. 10/919,005, filed Dec. 2005, Eichenberger, et al.
U.S. Appl. No. 12/109,151, filed Apr. 2008, Agapi, et al.
U.S. Appl. No. 12/109,167, filed Apr. 2008, Agapi, et al.
U.S. Appl. No. 12/109,204, filed Apr. 2008, Agapi, et al.
U.S. Appl. No. 12/109,227, filed Apr. 2008, Agapi, et al.
U.S. Appl. No. 12/109,214, filed Apr. 2008, Agapi, et al.
Eide, et al; Multilayered Extensions to the Speech Synthesis Markup Language for Describing Expressiveness; Proceedings Of The 8th European Conference On Speech Communication And Technology; Sep. 1-4, 2003; Geneva, Switzerland.
Office Action in Chinese Patent Application No. 200810091646.X issued Jul. 14, 2010.

* cited by examiner

PROVIDING EXPRESSIVE USER INTERACTION WITH A MULTIMODAL APPLICATION

BACKGROUND OF THE INVENTION

1. Field of the Invention

The field of the invention is data processing, or, more specifically, methods, apparatus, and products for providing expressive user interaction with a multimodal application.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through multimodal access, that is, by interaction in non-voice modes as well as voice mode. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications are often formed by sets of markup documents served up by web servers for display on multimodal browsers. A 'multimodal browser,' as the term is used in this specification, generally means a web browser capable of receiving multimodal input and interacting with users with multimodal output, where modes of the multimodal input and output include at least a speech mode. Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. Visual markup tells a multimodal browser what the user interface is look like and how it is to behave when the user types, points, or clicks. Similarly, voice markup tells a multimodal browser what to do when the user speaks to it. For visual markup, the multimodal browser uses a graphics engine; for voice markup, the multimodal browser uses a speech engine. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

In addition to X+V, multimodal applications also may be implemented with Speech Application Tags ('SALT'). SALT is a markup language developed by the Salt Forum. Both X+V and SALT are markup languages for creating applications that use voice input/speech recognition and voice output/speech synthesis. Both SALT applications and X+V applications use underlying speech recognition and synthesis technologies or 'speech engines' to do the work of recognizing and generating human speech. As markup languages, both X+V and SALT provide markup-based programming environments for using speech engines in an application's user interface. Both languages have language elements, markup tags, that specify what the speech-recognition engine should listen for and what the synthesis engine should 'say.' Whereas X+V combines XHTML, VoiceXML, and the XML Events standard to create multimodal applications, SALT does not provide a standard visual markup language or eventing model. Rather, it is a low-level set of tags for specifying voice interaction that can be embedded into other environments. In addition to X+V and SALT, multimodal applications may be implemented in Java with a Java speech framework, in C++, for example, and with other technologies and in other environments as well.

As mentioned above, current multimodal applications provide user interaction with a multimodal device through a variety of modalities. For example, a multimodal application may provide user interaction through a voice mode using a speaker and a microphone or through a visual mode using a graphical user interface. Within each mode of user interaction, a multimodal application may vary the expressiveness of the interaction with the user. For example, within the voice mode of user interaction, the multimodal application may use a strong, confident voice to prompt a user for input and use a meek, more hesitant voice when requesting the user to clarity the response. Within the visual mode of user interaction, the multimodal application may use normal text on a graphical user interface to prompt a user for input and use a bold, red text to indicate that the user needs to provide a more detailed response. The drawback to current multimodal applications, however, is that expressive user interaction is not typically synchronized across multiple modes of user interaction. That is, input provided in a one mode of user interaction does not affect the expressiveness of user interaction in other modes of user interaction. As such, readers will appreciates that room for improvement exists in providing expressive user interaction with a multimodal application.

SUMMARY OF THE INVENTION

Methods, apparatus, and products are disclosed for providing expressive user interaction with a multimodal application, the multimodal application operating in a multimodal browser on a multimodal device supporting multiple modes of user interaction including a voice mode and one or more non-voice modes, the multimodal application operatively coupled to a speech engine through a VoiceXML interpreter, including: receiving, by the multimodal browser, user input from a user through a particular mode of user interaction; determining, by the multimodal browser, user output for the user in dependence upon the user input; determining, by the multimodal browser, a style for the user output in dependence upon the user input, the style specifying expressive output characteristics for at least one other mode of user interaction; and rendering, by the multimodal browser, the user output in dependence upon the style.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary methods, apparatus, and products for providing expressive user interaction with a multimodal application according to embodiments of the present invention are described with reference to the accompanying drawings, beginning with FIG. 1.

Figure 1:
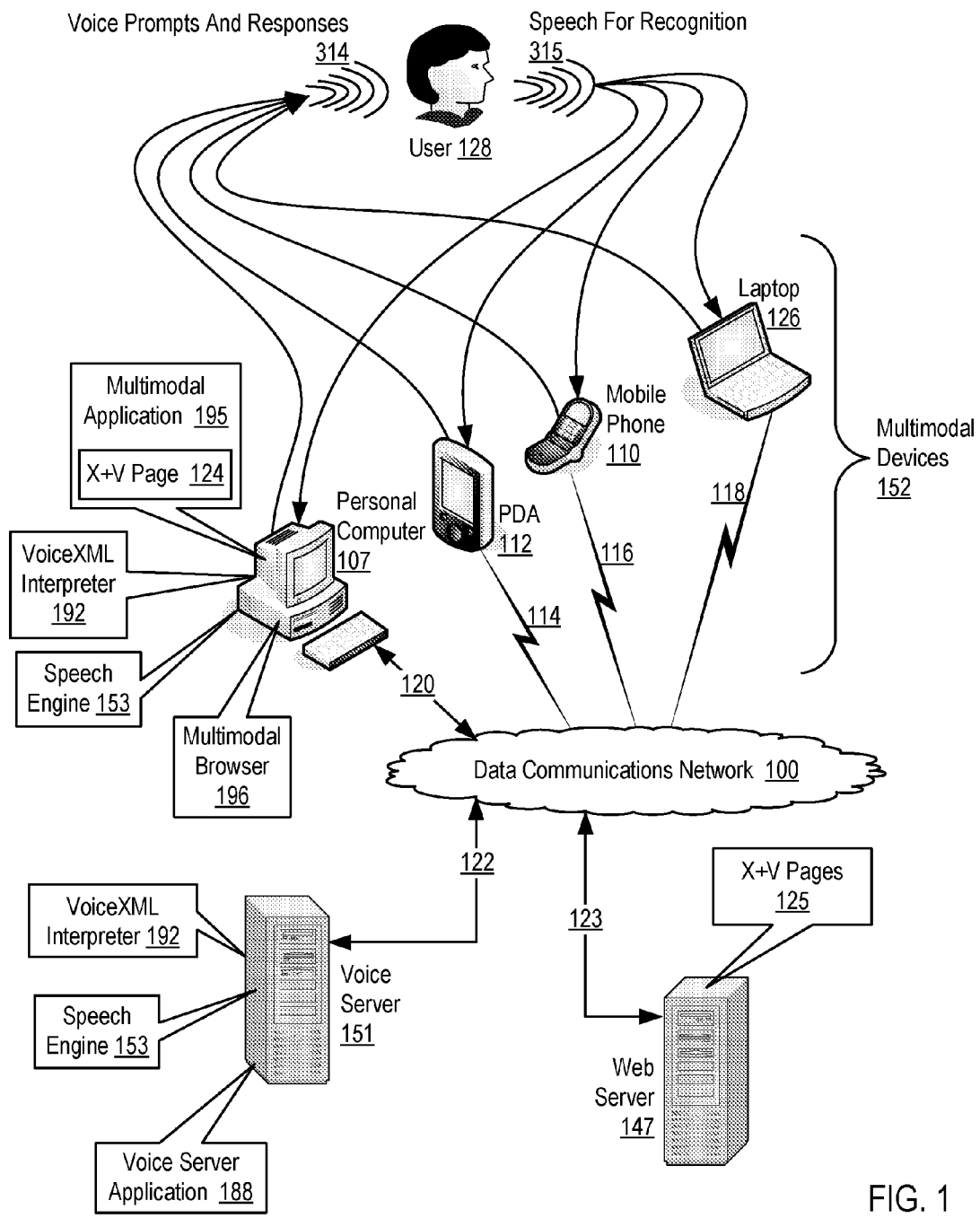
FIG. 1 sets forth a network diagram illustrating an exemplary system for providing expressive user interaction with a multimodal application according to embodiments of the present invention.

FIG. 1 sets forth a network diagram illustrating an exemplary system for providing expressive user interaction with a multimodal application (195) according to embodiments of the present invention. Expressive user interaction refers generally to communications from a multimodal application that provides information to a user through the communication itself and the manner in which the communication is conveyed to the user. The manner in which the communication is conveyed to the user may be used to represent a particular emotion, a particular attitude, conveys a sense of proximity, conveys a level of articulation, and so on. For example, the multimodal application may convey information to a user in a manner that represents anger by increasing the volume level of an output message as the message is played through a speaker or by displaying text using bold, red lettering.

Providing expressive user interaction with a multimodal application in this example is implemented with a multimodal application (195) operating in a multimodal browser (196) on a multimodal device (152). The multimodal application (195) of FIG. 1 is composed of at least one X+V page (124). The multimodal device (152) of FIG. 1 supports multiple modes of interaction including a voice mode and one or more non-voice modes of user interaction with the multimodal application (195). The voice mode is represented here with audio output of voice prompts and responses (314) from the multimodal devices and audio input of speech for recognition (315) from a user (128). Non-voice modes are represented by input/output devices such as keyboards and display screens on the multimodal devices (152). The multimodal application (195) is operatively coupled (195) to a speech engine (153) through a VoiceXML interpreter (192). The operative coupling may be implemented with an application programming interface ('API'), a voice service module, or a VOIP connection as explained more detail below.

In the exemplary system of FIG. 1, the multimodal browser (196) provides an execution environment for the multimodal application (195). The multimodal browser (196) of FIG. 1 includes computer program instructions configured to provide expressive user interaction with a multimodal application (195) according to embodiments of the present invention. The multimodal browser (196) of FIG. 1 operates generally for providing expressive user interaction with a multimodal application (195) according to embodiments of the present invention by: receiving user input from a user through a particular mode of user interaction; determining user output for the user in dependence upon the user input; determining a style for the user output in dependence upon the user input; and rendering the user output in dependence upon the style.

The style for the user output specifies expressive output characteristics for at least one other mode of user interaction than the mode of user interaction through which the multimodal browser received the user input. For example, if the multimodal browser received the user input through a voice mode using a microphone, then the style for the user output may specify expressive output characteristics for a visual mode through a graphical user interface. Similarly, if the multimodal browser received the user input through a visual mode using a graphical user interface, then the style for the user output may specify expressive output characteristics for a voice mode through a speaker. Specifying expressive output characteristics for at least one other mode of user interaction advantageous allows the multimodal browser to provide expressive user interaction with a multimodal application using a mode other than the mode of user interaction through which the multimodal browser received the user input.

To support the multimodal browser (196) in processing the multimodal application (195), the system of FIG. 1 includes a VoiceXML interpreter (192). The VoiceXML interpreter (192) is a software module of computer program instructions that accepts voice dialog instructions and other data from the multimodal browser (196) for processing. The voice dialog and other data processed by the VoiceXML interpreter (192) are specified in the multimodal application (195), typically in the form of a VoiceXML <form> element. The voice dialog instructions include one or more grammars, data input elements, event handlers, styles, and so on, that advise the VoiceXML interpreter (192) how to administer voice input from a user and voice prompts and responses to be presented to a user. The VoiceXML interpreter (192) administers such dialogs by processing the dialog instructions sequentially in accordance with a VoiceXML Form Interpretation Algorithm ('FIA').

As mentioned above, the VoiceXML interpreter (192) of FIG. 1 processes voice dialog instructions that include one or more grammars. A grammar communicates to the speech engine (153) or the VoiceXML interpreter (192) the words and sequences of words that currently may be recognized. In the example of FIG. 1, a grammar includes grammar rules that advise a speech engine or a voice interpreter which words and word sequences presently can be recognized. Grammars for use according to embodiments of the present invention may be expressed in any format supported by a speech engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V<form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
    #JSGF V1.0;
    grammar command;
    <command> = [remind me to] call | phone | telephone <name>
    <when>;
    <name> = bob | martha | joe | pete | chris | john | artoush | tom;
    <when> = today | this afternoon | tomorrow | next week;
    ]]>
</grammar>
```

In this example, the elements named <command>, <name>, and <when> are rules of the grammar. Rules are a combination of a rulename and an expansion of a rule that advises a speech engine or a VoiceXML interpreter which words presently can be recognized. In the example above, rule expansions includes conjunction and disjunction, and the vertical bars '|' mean 'or.' A speech engine or a VoiceXML interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush' or 'tom,' and the <when> rule accepts 'today' or 'this afternoon' or 'tomorrow' or 'next week.' The command grammar as a whole matches utterances like these, for example:

"phone bob next week,"
"telephone martha this afternoon,"
"remind me to call chris tomorrow," and
"remind me to phone pete today."

A multimodal device on which a multimodal application operates is an automated device, that is, automated computing machinery or a computer program running on an automated device, that is capable of accepting from users more than one mode of input, keyboard, mouse, stylus, and so on, including speech input—and also providing more than one mode of output such as, graphic, speech, and so on. A multimodal device is generally capable of accepting speech input from a user, digitizing the speech, and providing digitized speech to a speech engine for recognition. A multimodal device may be implemented, for example, as a voice-enabled browser on a laptop, a voice browser on a telephone handset, an online game implemented with Java on a personal computer, and with other combinations of hardware and software as may occur to those of skill in the art. Because multimodal applications may be implemented in markup languages (X+V, SALT), object-oriented languages (Java, C++), procedural languages (the C programming language), and in other kinds of computer languages as may occur to those of skill in the art, a multimodal application may refer to any software application, server-oriented or client-oriented, thin client or thick client, that administers more than one mode of input and more than one mode of output, typically including visual and speech modes.

The system of FIG. 1 includes several example multimodal devices:
    personal computer (107) which is coupled for data communications to data communications network (100) through wireline connection (120),
    personal digital assistant ('PDA') (112) which is coupled for data communications to data communications network (100) through wireless connection (114),
    mobile telephone (110) which is coupled for data communications to data communications network (100) through wireless connection (116), and
    laptop computer (126) which is coupled for data communications to data communications network (100) through wireless connection (118).

Each of the example multimodal devices (152) in the system of FIG. 1 includes a microphone, an audio amplifier, a digital-to-analog converter, and a multimodal application capable of accepting from a user (128) speech for recognition (315), digitizing the speech, and providing the digitized speech to a speech engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled
    RTP Payload Format for European Telecommunications Standards Institute (ETSI) European Standard ES 201 108 Distributed Speech Recognition Encoding
and the Internet Draft entitled
    RTP Payload Formats for European Telecommunications Standards Institute (ETSI) European Standard ES 202 050, ES 202 211, and ES 202 212 Distributed Speech Recognition Encoding,
the IETF provides standard RTP payload formats for various codecs. It is useful to note, therefore, that there is no limitation in the present invention regarding codecs, payload formats, or packet structures. Speech for providing expressive user interaction with a multimodal application according to embodiments of the present invention may be encoded with any codec, including, for example:
    AMR (Adaptive Multi-Rate Speech coder)
    ARDOR (Adaptive Rate-Distortion Optimized sound codeR),
    Dolby Digital (A/52, AC3),
    DTS (DTS Coherent Acoustics),
    MP1 (MPEG audio layer-1),
    MP2 (MPEG audio layer-2) Layer 2 audio codec (MPEG-1, MPEG-2 and non-ISO MPEG-2.5),
    MP3 (MPEG audio layer-3) Layer 3 audio codec (MPEG-1, MPEG-2 and non-ISO MPEG-2.5),
    Perceptual Audio Coding,
    FS-1015 (LPC-10),
    FS-1016 (CELP),
    G.726 (ADPCM),
    G.728 (LD-CELP),
    G.729 (CS-ACELP),
    GSM,
    HILN (MPEG-4 Parametric audio coding), and
    others as may occur to those of skill in the art.

As mentioned, a multimodal device according to embodiments of the present invention is capable of providing speech to a speech engine for recognition. The speech engine (153) of FIG. 1 is a functional module, typically a software module, although it may include specialized hardware also, that does the work of recognizing and generating or 'synthesizing' human speech. The speech engine (153) implements speech recognition by use of a further module referred to in this specification as a automatic speech recognition ('ASR') engine, and the speech engine carries out speech synthesis by use of a further module referred to in this specification as a text-to-speech ('TTS') engine. As shown in FIG. 1, a speech engine (153) may be installed locally in the multimodal device (107) itself, or a speech engine (153) may be installed remotely with respect to the multimodal device, across a data communications network (100) in a voice server (151). A multimodal device that itself contains its own speech engine is said to implement a 'thick multimodal client' or 'thick client,' because the thick multimodal client device itself contains all the functionality needed to carry out speech recognition and speech synthesis—through API calls to speech recognition and speech synthesis modules in the multimodal device itself with no need to send requests for speech recognition across a network and no need to receive synthesized speech across a network from a remote voice server. A multimodal device that does not contain its own speech engine is said to implement a 'thin multimodal client' or simply a 'thin client,' because the thin multimodal client itself contains only a relatively thin layer of multimodal application software that obtains speech recognition and speech synthesis services from a voice server located remotely across a network from the thin client. For ease of explanation, only one (107) of the multimodal devices (152) in the system of FIG. 1 is shown with a speech engine (153), but readers will recognize that any multimodal device may have a speech engine according to embodiments of the present invention.

A multimodal application (195) in this example provides speech for recognition and text for speech synthesis to a speech engine through the VoiceXML interpreter (192). As shown in FIG. 1, the VoiceXML interpreter (192) may be installed locally in the multimodal device (107) itself, or the VoiceXML interpreter (192) may be installed remotely with respect to the multimodal device, across a data communications network (100) in a voice server (151). In a thick client architecture, a multimodal device (152) includes both its own speech engine (153) and its own VoiceXML interpreter (192). The VoiceXML interpreter (192) exposes an API to the multimodal application (195) for use in providing speech recognition and speech synthesis for the multimodal application. The multimodal application (195) provides dialog instructions, VoiceXML <form> elements, grammars, input elements, event handlers, and so on, through the API to the VoiceXML interpreter, and the VoiceXML interpreter administers the speech engine on behalf of the multimodal browser (196) executing the multimodal application (195). In the thick client architecture, VoiceXML dialogs are interpreted by a VoiceXML interpreter on the multimodal device. In the thin client architecture, VoiceXML dialogs are interpreted by a VoiceXML interpreter on a voice server (151) located remotely across a data communications network (100) from the multimodal device running the multimodal application (195).

The VoiceXML interpreter (192) provides grammars, speech for recognition, and text prompts and styles for speech synthesis to the speech engine (153), and the VoiceXML interpreter (192) returns to the multimodal application speech engine (153) output in the form of recognized speech, semantic interpretation results, and digitized speech for voice prompts. In a thin client architecture, the VoiceXML interpreter (192) is located remotely from the multimodal client device in a voice server (151), the API for the VoiceXML interpreter is still implemented in the multimodal device (152), with the API modified to communicate voice dialog instructions, speech for recognition, and text and voice prompts to and from the VoiceXML interpreter on the voice server (151). For ease of explanation, only one (107) of the multimodal devices (152) in the system of FIG. 1 is shown with a VoiceXML interpreter (192), but readers will recognize that any multimodal device may have a VoiceXML interpreter according to embodiments of the present invention. Each of the example multimodal devices (152) in the system of FIG. 1 may be configured for providing expressive user interaction with a multimodal application by installing and running on the multimodal device a VoiceXML interpreter and an ASR engine that supports providing expressive user interaction with a multimodal application according to embodiments of the present invention.

The use of these four example multimodal devices (152) is for explanation only, not for limitation of the invention. Any automated computing machinery capable of accepting speech from a user, providing the speech digitized to an ASR engine through a VoiceXML interpreter, and receiving and playing speech prompts and responses from the VoiceXML interpreter may be improved to function as a multimodal device according to embodiments of the present invention.

The system of FIG. 1 also includes a voice server (151), which is connected to data communications network (100) through wireline connection (122). The voice server (151) is a computer that runs a speech engine (153) that provides voice recognition services for multimodal devices by accepting requests for speech recognition and returning text representing recognized speech. Voice server (151) also provides speech synthesis, text to speech ('TTS') conversion, for voice prompts and voice responses (314) to user input in multimodal applications such as, for example, X+V applications, SALT applications, or Java voice applications.

The system of FIG. 1 includes a data communications network (100) that connects the multimodal devices (152) and the voice server (151) for data communications. A data communications network for providing expressive user interaction with a multimodal application according to embodiments of the present invention is a data communications data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

- a link layer with the Ethernet™ Protocol or the Wireless Ethernet™ Protocol,
- a data communications network layer with the Internet Protocol ('IP'),
- a transport layer with the Transmission Control Protocol ('TCP') or the User Datagram Protocol ('UDP'),
- an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and
- other protocols as will occur to those of skill in the art.

The system of FIG. 1 also includes a web server (147) connected for data communications through wireline connection (123) to network (100) and therefore to the multimodal devices (152). The web server (147) may be any server that provides to client devices X+V markup documents (125) that compose multimodal applications. The web server (147) typically provides such markup documents via a data communications protocol, HTTP, HDTP, WAP, or the like. That is, although the term 'web' is used to described the web server generally in this specification, there is no limitation of data communications between multimodal devices and the web server to HTTP alone. A multimodal application in a multimodal device then, upon receiving from the web sever (147) an X+V markup document as part of a multimodal application, may execute speech elements by use of a VoiceXML interpreter (192) and speech engine (153) in the multimodal device itself or by use of a VoiceXML interpreter (192) and speech engine (153) located remotely from the multimodal device in a voice server (151).

The arrangement of the multimodal devices (152), the web server (147), the voice server (151), and the data communications network (100) making up the exemplary system illustrated in FIG. 1 are for explanation, not for limitation. Data processing systems useful for providing expressive user interaction with a multimodal application according to various embodiments of the present invention may include additional servers, routers, other devices, and peer-to-peer architectures, not shown in FIG. 1, as will occur to those of skill in the art. Data communications networks in such data processing systems may support many data communications protocols in addition to those noted above. Various embodiments of the present invention may be implemented on a variety of hardware platforms in addition to those illustrated in FIG. 1.

Providing expressive user interaction with a multimodal application according to embodiments of the present invention in a thin client architecture may be implemented with one or more voice servers, computers, that is, automated computing machinery, that provide speech recognition and speech synthesis. For further explanation, therefore, FIG. 2 sets forth a block diagram of automated computing machinery comprising an example of a computer useful as a voice server (151) in providing expressive user interaction with a multimodal application according to embodiments of the present invention. The exemplary voice server (151) provides voice services to a multimodal application operating in a multimodal browser on a multimodal device connected via a network to the voice server (151). The exemplary voice server (151) is useful in a system providing expressive user interaction with a multimodal application according to embodiments of the present invention that includes: receiving, by the multimodal browser, user input from a user through a particular mode of user interaction; determining, by the multimodal browser, user output for the user in dependence upon the user input; determining, by the multimodal browser, a style for the user output in dependence upon the user input, the style specifying expressive output characteristics for at least one other mode of user interaction; and rendering, by the multimodal browser, the user output in dependence upon the style.

Figure 2:
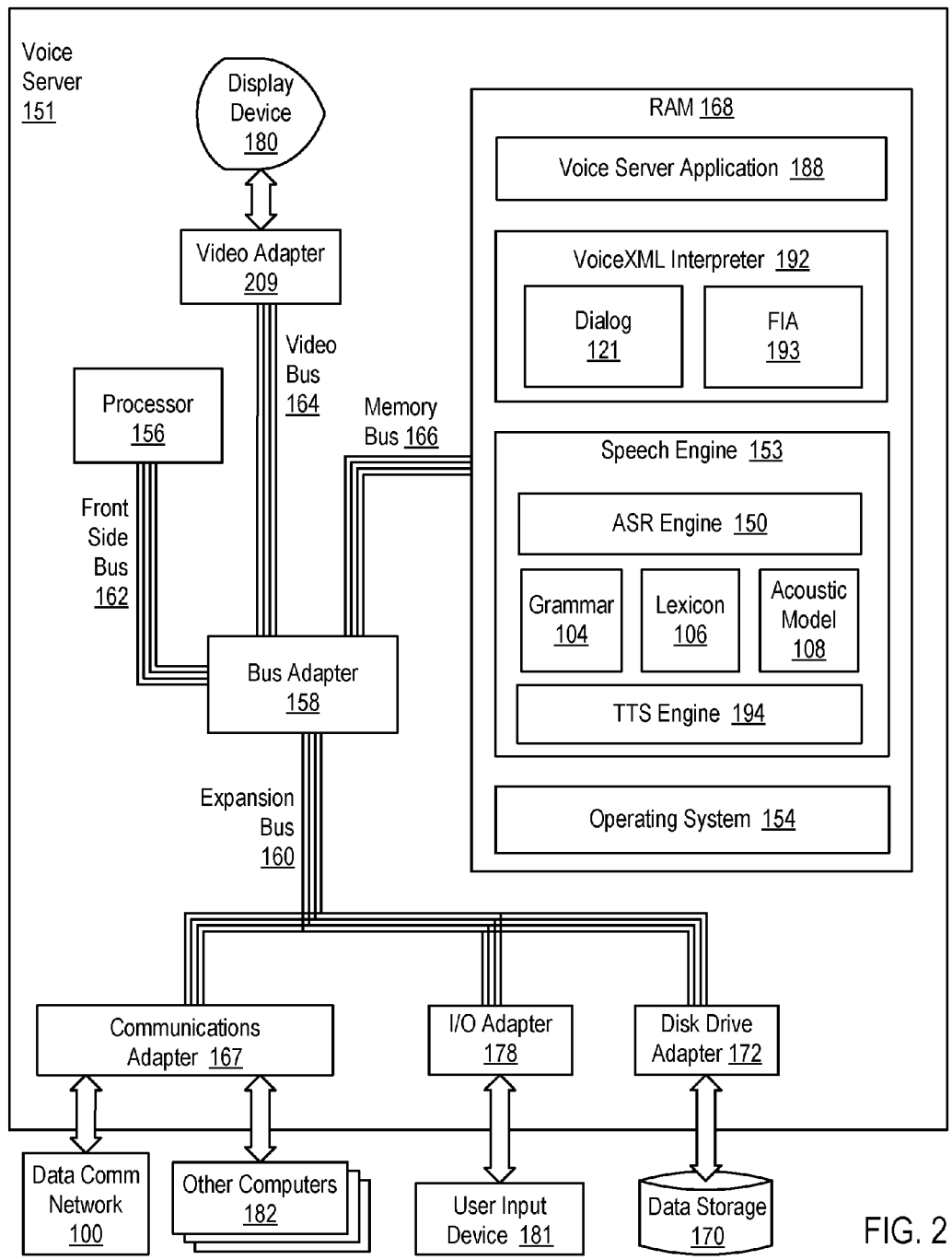
FIG. 2 sets forth a block diagram of automated computing machinery comprising an example of a computer useful as a voice server in providing expressive user interaction with a multimodal application according to embodiments of the present invention.

The voice server (151) of FIG. 2 includes at least one computer processor (156) or 'CPU' as well as random access memory (168) ('RAM'). The RAM (168) is connected through a high speed memory bus (166) and bus adapter (158) to processor (156) and to other components of the voice server (151).

Stored in RAM (168) is a voice server application (188), a module of computer program instructions capable of operating a voice server in a system that is configured for providing expressive user interaction with a multimodal application according to embodiments of the present invention. Voice server application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in multimodal applications such as, for example, X+V applications, SALT applications, or Java Speech applications. Voice server application (188) may be implemented as a web server, implemented in Java, C++, or another language, that supports providing expressive user interaction with a multimodal application according embodiments of the present invention.

The voice server (151) in this example includes a speech engine (153). The speech engine is a functional module, typically a software module, although it may include specialized hardware also, that does the work of recognizing and synthesizing human speech. The speech engine (153) includes an automated speech recognition ('ASR') engine (150) for speech recognition and a text-to-speech ('TTS') engine (194) for synthesizing speech. The speech engine (153) also includes a grammar (104) created by a VoiceXML interpreter (192) in dependence upon predictive texts for a predictive text event. The speech engine (153) also includes a lexicon (106) and a language-specific acoustic model (108). The language-specific acoustic model (108) is a data structure, a table or database, for example, that associates Speech Feature Vectors with phonemes representing, to the extent that it is practically feasible to do so, all pronunciations of all the words in a human language. The lexicon (106) is an association of words in text form with phonemes representing pronunciations of each word; the lexicon effectively identifies words that are capable of recognition by an ASR engine. Also stored in RAM (168) is a Text To Speech ('TTS') Engine (194), a module of computer program instructions that accepts text as input and returns the same text in the form of digitally encoded speech, for use in providing speech as prompts for and responses to users of multimodal systems.

The voice server application (188) in this example is configured to receive, from a multimodal client located remotely across a network from the voice server, digitized speech for recognition from a user and pass the speech along to the ASR engine (150) for recognition. ASR engine (150) is a module of computer program instructions, also stored in RAM in this example. In carrying out providing expressive user interaction with a multimodal application, the ASR engine (150) receives speech for recognition in the form of at least one digitized word and uses frequency components of the digitized word to derive a Speech Feature Vector ('SFV'). An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

In the example of FIG. 2, the voice server application (188) passes the speech along to the ASR engine (150) for recognition through a VoiceXML interpreter (192). The VoiceXML interpreter (192) is a software module of computer program instructions that accepts voice dialogs (121) from a multimodal application running remotely on a multimodal device. The dialogs (121) include dialog instructions, typically implemented in the form of a VoiceXML <form> element. The voice dialog instructions include one or more grammars, data input elements, event handlers, and so on, that advise the VoiceXML interpreter (192) how to administer voice input from a user and voice prompts and responses to be presented to a user. The VoiceXML interpreter (192) administers such dialogs by processing the dialog instructions sequentially in accordance with a VoiceXML Form Interpretation Algorithm ('FIA') (193).

Also stored in RAM (168) is an operating system (154). Operating systems useful in voice servers according to embodiments of the present invention include UNIX™, Linux™, Microsoft NT™, IBM's AIX™, IBM's i5/OS™, and others as will occur to those of skill in the art. Operating system (154), voice server application (188), VoiceXML interpreter (192), speech engine (153), including ASR engine (150), and TTS Engine (194) in the example of FIG. 2 are shown in RAM (168), but many components of such software typically are stored in non-volatile memory also, for example, on a disk drive (170).

Voice server (151) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention may include Peripheral Component Interconnect ('PCI') buses and PCI Express ('PCIe') buses.

Voice server (151) of FIG. 2 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 2 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary voice server (151) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for providing expressive user interaction with a multimodal application according to embodiments of the present invention include modems for wired dial-up communications, Ethernet (IEEE 802.3) adapters for wired data communications network communications, and 802.11 adapters for wireless data communications network communications.

Figure 3:
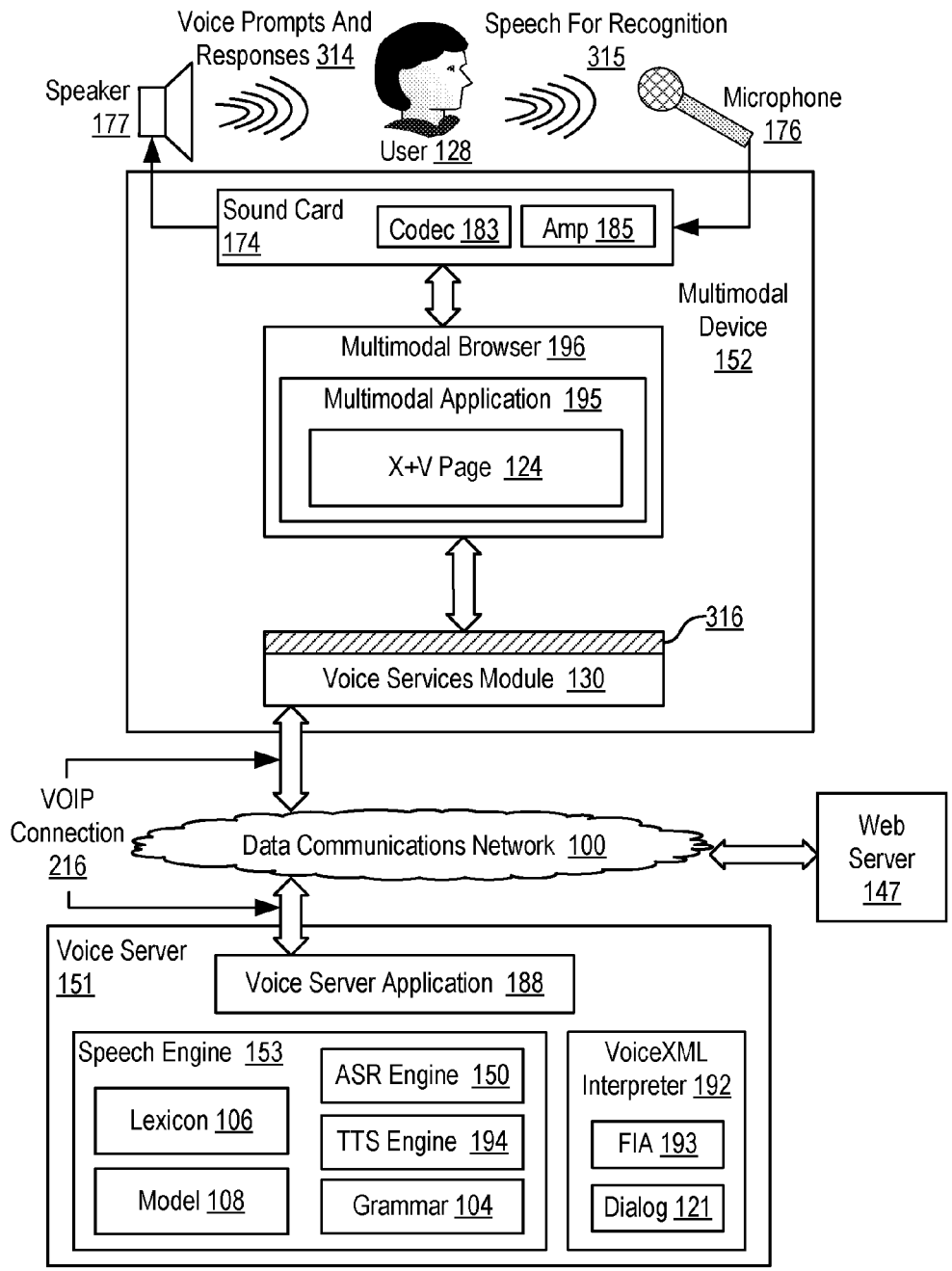
FIG. 3 sets forth a functional block diagram of exemplary apparatus for providing expressive user interaction with a multimodal application according to embodiments of the present invention.

For further explanation, FIG. 3 sets forth a functional block diagram of exemplary apparatus for providing expressive user interaction with a multimodal application of a multimodal application in a thin client architecture according to embodiments of the present invention. The example of FIG. 3 includes a multimodal device (152) and a voice server (151) connected for data communication by a VOIP connection (216) through a data communications network (100). A multimodal application (195) operates in a multimodal browser (196) on the multimodal device (152), and a voice server application (188) operates on the voice server (151). The multimodal application (195) may be a composed of at least one X+V page (124) that executes in the multimodal browser (196).

In the example of FIG. 3, the multimodal device (152) supports multiple modes of interaction including a voice mode and one or more non-voice modes. The exemplary multimodal device (152) of FIG. 3 supports voice with a sound card (174), which is an example of an I/O adapter specially designed for accepting analog audio signals from a microphone (176) and converting the audio analog signals to digital form for further processing by a codec (183). The example multimodal device (152) of FIG. 3 may support non-voice modes of user interaction with keyboard input, mouseclicks, a graphical user interface ('GUI'), and so on, as will occur to those of skill in the art.

The multimodal browser (196) of FIG. 3 provides an execution environment for the multimodal application (195). The multimodal browser (196) of FIG. 3 includes computer program instructions configured to provide expressive user interaction with a multimodal application (195) according to embodiments of the present invention. The multimodal browser (196) of FIG. 1 operates generally for providing expressive user interaction with a multimodal application (195) according to embodiments of the present invention by: receiving user input from a user through a particular mode of user interaction; determining user output for the user in dependence upon the user input; determining a style for the user output in dependence upon the user input, the style specifying expressive output characteristics for at least one other mode of user interaction; and rendering the user output in dependence upon the style.

In addition to the voice sever application (188), the voice server (151) also has installed upon it a speech engine (153) with an ASR engine (150), a grammar (104), a lexicon (106), a language-specific acoustic model (108), and a TTS engine (194), as well as a Voice XML interpreter (192) that includes a form interpretation algorithm (193). VoiceXML interpreter (192) interprets and executes a VoiceXML dialog (121) received from the multimodal application and provided to VoiceXML interpreter (192) through voice server application (188). VoiceXML input to VoiceXML interpreter (192) may originate from the multimodal application (195) implemented as an X+V client running remotely in a multimodal browser (196) on the multimodal device (152). The VoiceXML interpreter (192) administers such dialogs by processing the dialog instructions sequentially in accordance with a VoiceXML Form Interpretation Algorithm ('FIA') (193).

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols are used to effect VOIP. The two most popular types of VOIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The apparatus of FIG. 3 operates in a manner that is similar to the operation of the system of FIG. 2 described above. Multimodal application (195) is a user-level, multimodal, client-side computer program that presents a voice interface to user (128), provides audio prompts and responses (314) and accepts input speech for recognition (315). Multimodal application (195) provides a speech interface through which a user may provide oral speech for recognition (315) through microphone (176) and have the speech digitized through an audio amplifier (185) and a coder/decoder ('codec') (183) of a sound card (174) and provide the digitized speech for recognition to ASR engine (150). Multimodal application (195), through the multimodal browser (196), an API (316), and a voice services module (130), then packages the digitized speech in a recognition request message according to a VOIP protocol, and transmits the speech to voice server (151) through the VOIP connection (216) on the network (100).

Voice server application (188) provides voice recognition services for multimodal devices by accepting dialog instructions, VoiceXML segments, and returning speech recognition results, including text representing recognized speech, text for use as variable values in dialogs, and output from execution of semantic interpretation scripts—as well as voice prompts. Voice server application (188) includes computer program instructions that provide text-to-speech ('TTS') conversion for voice prompts and voice responses to user input in multimodal applications providing responses to HTTP requests from multimodal browsers running on multimodal devices.

The voice server application (188) receives speech for recognition from a user and passes the speech through API calls to VoiceXML interpreter (192) which in turn uses an ASR engine (150) for speech recognition. The ASR engine receives digitized speech for recognition, uses frequency components of the digitized speech to derive an SFV, uses the SFV to infer phonemes for the word from the language-specific acoustic model (108), and uses the phonemes to find the speech in the lexicon (106).

The ASR engine then compares speech found as words in the lexicon to words in a grammar (104) to determine whether words or phrases in speech are recognized by the ASR engine. The multimodal application (195) is operatively coupled to the speech engine (153) through the VoiceXML interpreter (192). In this example, the operative coupling to the speech engine (153) through a VoiceXML interpreter (192) is implemented with a VOIP connection (216) through a voice services module (130). The voice services module is a thin layer of functionality, a module of computer program instructions, that presents an API (316) for use by an application level program in providing dialogs (121) and speech for recognition to a VoiceXML interpreter and receiving in response voice prompts and other responses, including action identifiers according to embodiments of the present invention. The VoiceXML interpreter (192), in turn, utilizes the speech engine (153) for speech recognition and generation services.

In the example of FIG. 3, the voice services module (130) provides data communications services through the VOIP connection and the voice server application (188) between the multimodal device (152) and the VoiceXML interpreter (192). The API (316) is the same API presented to applications by a VoiceXML interpreter when the VoiceXML interpreter is installed on the multimodal device in a thick client architecture. So from the point of view of an application calling the API (316), the application is calling the VoiceXML interpreter directly. The data communications functions of the voice services module (130) are transparent to applications that call the API (316). At the application level, calls to the API (316) may be issued from the multimodal browser (196), which provides an execution environment for the multimodal application (195).

Figure 4:
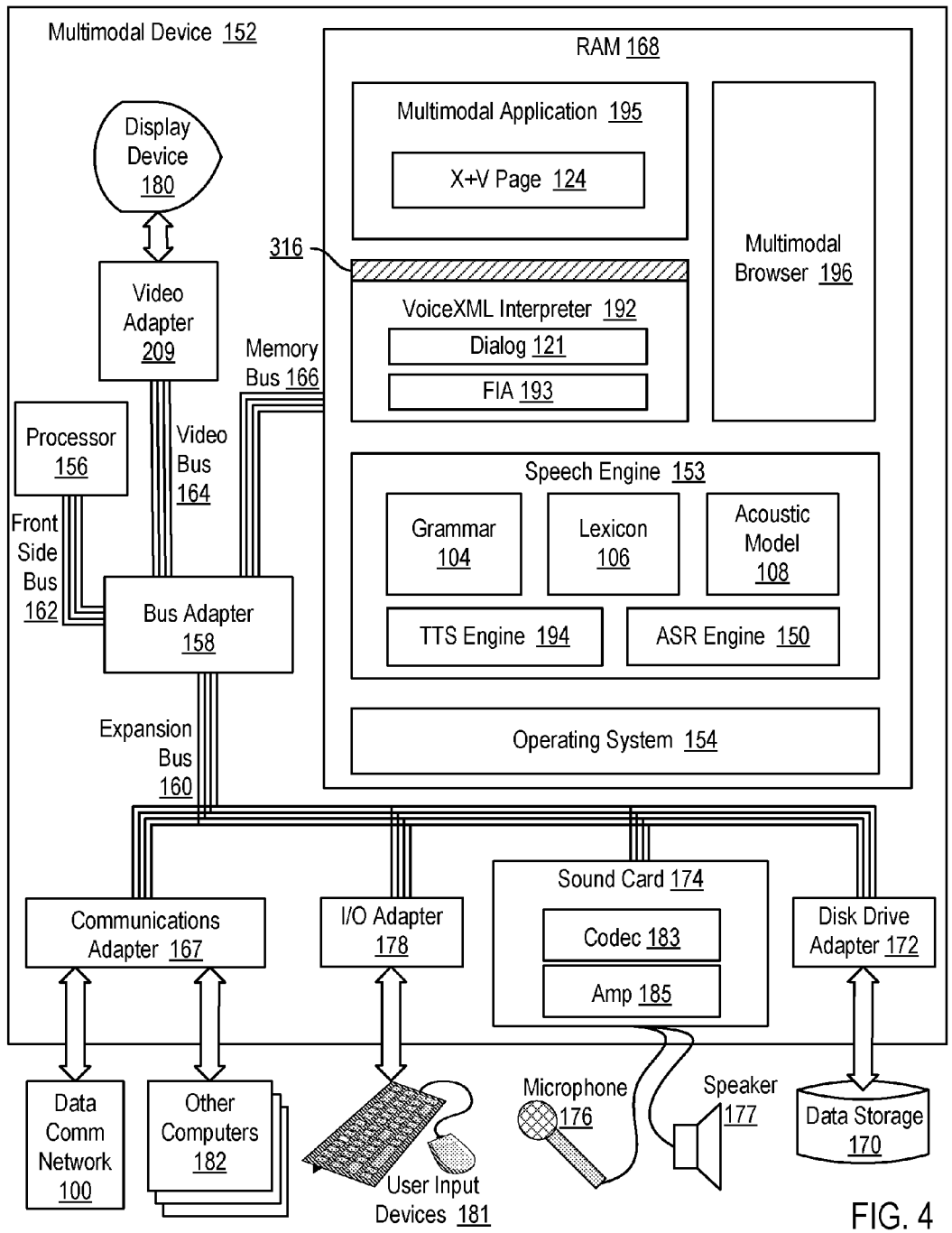
FIG. 4 sets forth a block diagram of automated computing machinery comprising an example of a computer useful as a multimodal device in providing expressive user interaction with a multimodal application according to embodiments of the present invention.

Providing expressive user interaction with a multimodal application of a multimodal application according to embodiments of the present invention in thick client architectures is generally implemented with multimodal devices, that is, automated computing machinery or computers. In the system of FIG. 1, for example, all the multimodal devices (152) are implemented to some extent at least as computers. For further explanation, therefore, FIG. 4 sets forth a block diagram of automated computing machinery comprising an example of a computer useful as a multimodal device (152) in providing expressive user interaction with a multimodal application according to embodiments of the present invention. In a multimodal device implementing a thick client architecture as illustrated in FIG. 4, the multimodal device (152) has no connection to a remote voice server containing a VoiceXML interpreter and a speech engine. Rather, all the components needed for speech synthesis and voice recognition in providing expressive user interaction with a multimodal application according to embodiments of the present invention are installed or embedded in the multimodal device itself.

The example multimodal device (152) of FIG. 4 includes several components that are structured and operate similarly to parallel components of the voice server, having the same drawing reference numbers, as described above with reference to FIG. 2: at least one computer processor (156), frontside bus (162), RAM (168), high speed memory bus (166), bus adapter (158), video adapter (209), video bus (164), expansion bus (160), communications adapter (167), I/O adapter (178), disk drive adapter (172), an operating system (154), a VoiceXML Interpreter (192), a speech engine (153), and so on. As in the system of FIG. 2, the speech engine in the multimodal device of FIG. 4 includes an ASR engine (150), a grammar (104), a lexicon (106), a language-dependent acoustic model (108), and a TTS engine (194). The VoiceXML interpreter (192) administers dialogs (121) by processing the dialog instructions sequentially in accordance with a VoiceXML Form Interpretation Algorithm ('FIA') (193).

The speech engine (153) in this kind of embodiment, a thick client architecture, often is implemented as an embedded module in a small form factor device such as a handheld device, a mobile phone, PDA, and the like. An example of an embedded speech engine useful for providing expressive user interaction with a multimodal application according to embodiments of the present invention is IBM's Embedded ViaVoice Enterprise. The example multimodal device of FIG. 4 also includes a sound card (174), which is an example of an I/O adapter specially designed for accepting analog audio signals from a microphone (176) and converting the audio analog signals to digital form for further processing by a codec (183). The sound card (174) is connected to processor (156) through expansion bus (160), bus adapter (158), and front side bus (162).

Also stored in RAM (168) in this example is a multimodal application (195), a module of computer program instructions capable of operating a multimodal device as an apparatus that supports providing expressive user interaction with a multimodal application according to embodiments of the present invention. The multimodal application (195) implements speech recognition by accepting speech utterances for recognition from a user and sending the utterance for recognition through VoiceXML interpreter API calls to the ASR engine (150). The multimodal application (195) implements speech synthesis generally by sending words to be used as prompts for a user to the TTS engine (194) through VoiceXML interpreter API calls. As an example of thick client architecture, the multimodal application (195) in this example does not send speech for recognition across a network to a voice server for recognition, and the multimodal application (195) in this example does not receive synthesized speech, TTS prompts and responses, across a network from a voice server. All grammar processing, voice recognition, and text to speech conversion in this example is performed in an embedded fashion in the multimodal device (152) itself.

In FIG. 4, a multimodal browser (196) provides an execution environment for the multimodal application (195). The multimodal browser (196) of FIG. 4 includes computer program instructions configured to provide expressive user interaction with a multimodal application (195) according to embodiments of the present invention. The multimodal browser (196) of FIG. 1 operates generally for providing expressive user interaction with a multimodal application (195) according to embodiments of the present invention by: receiving user input from a user through a particular mode of user interaction; determining user output for the user in dependence upon the user input; determining a style for the user output in dependence upon the user input, the style specifying expressive output characteristics for at least one other mode of user interaction; and rendering the user output in dependence upon the style.

The multimodal application (195) in the example of FIG. 4 is a user-level, multimodal, client-side computer program that provides a speech interface through which a user may provide oral speech for recognition through microphone (176), have the speech digitized through an audio amplifier (185) and a coder/decoder ('codec') (183) of a sound card (174) and provide the digitized speech for recognition to ASR engine (150). The multimodal application (195) may be implemented as a set or sequence of X+V pages (124) executing in the multimodal browser (196) or microbrowser that passes VoiceXML grammars and digitized speech by calls through a VoiceXML interpreter API directly to an embedded VoiceXML interpreter (192) for processing. The embedded VoiceXML interpreter (192) may in turn issue requests for speech recognition through API calls directly to the embedded ASR engine (150). The embedded VoiceXML interpreter (192) may then issue requests to the action classifier (132) to determine an action identifier in dependence upon the recognized result provided by the ASR engine (150). Multimodal application (195) also can provide speech synthesis, TTS conversion, by API calls to the embedded TTS engine (194) for voice prompts and voice responses to user input.

The multimodal application (195) is operatively coupled to the speech engine (153) through a VoiceXML interpreter (192). In this example, the operative coupling through the VoiceXML interpreter is implemented using a VoiceXML interpreter API (316). The VoiceXML interpreter API (316) is a module of computer program instructions for use by an application level program in providing dialog instructions, speech for recognition, and other input to a VoiceXML interpreter and receiving in response voice prompts and other responses. The VoiceXML interpreter API presents the same application interface as is presented by the API of the voice service module (130 on FIG. 3) in a thin client architecture. At the application level, calls to the VoiceXML interpreter API may be issued from the multimodal browser (196), which provides an execution environment for the multimodal application (195) when the multimodal application is implemented with X+V. The VoiceXML interpreter (192), in turn, utilizes the speech engine (153) for speech recognition and synthesization services.

The multimodal application (195) in this example, running in a multimodal browser (196) on a multimodal device (152) that contains its own VoiceXML interpreter (192) and its own speech engine (153) with no network or VOIP connection to a remote voice server containing a remote VoiceXML interpreter or a remote speech engine, is an example of a so-called 'thick client architecture,' so-called because all of the functionality for processing voice mode interactions between a user and the multimodal application—as well as all or most of the functionality for providing expressive user interaction with a multimodal application of a multimodal application according to embodiments of the present invention—is implemented on the multimodal device itself.

Figure 5:
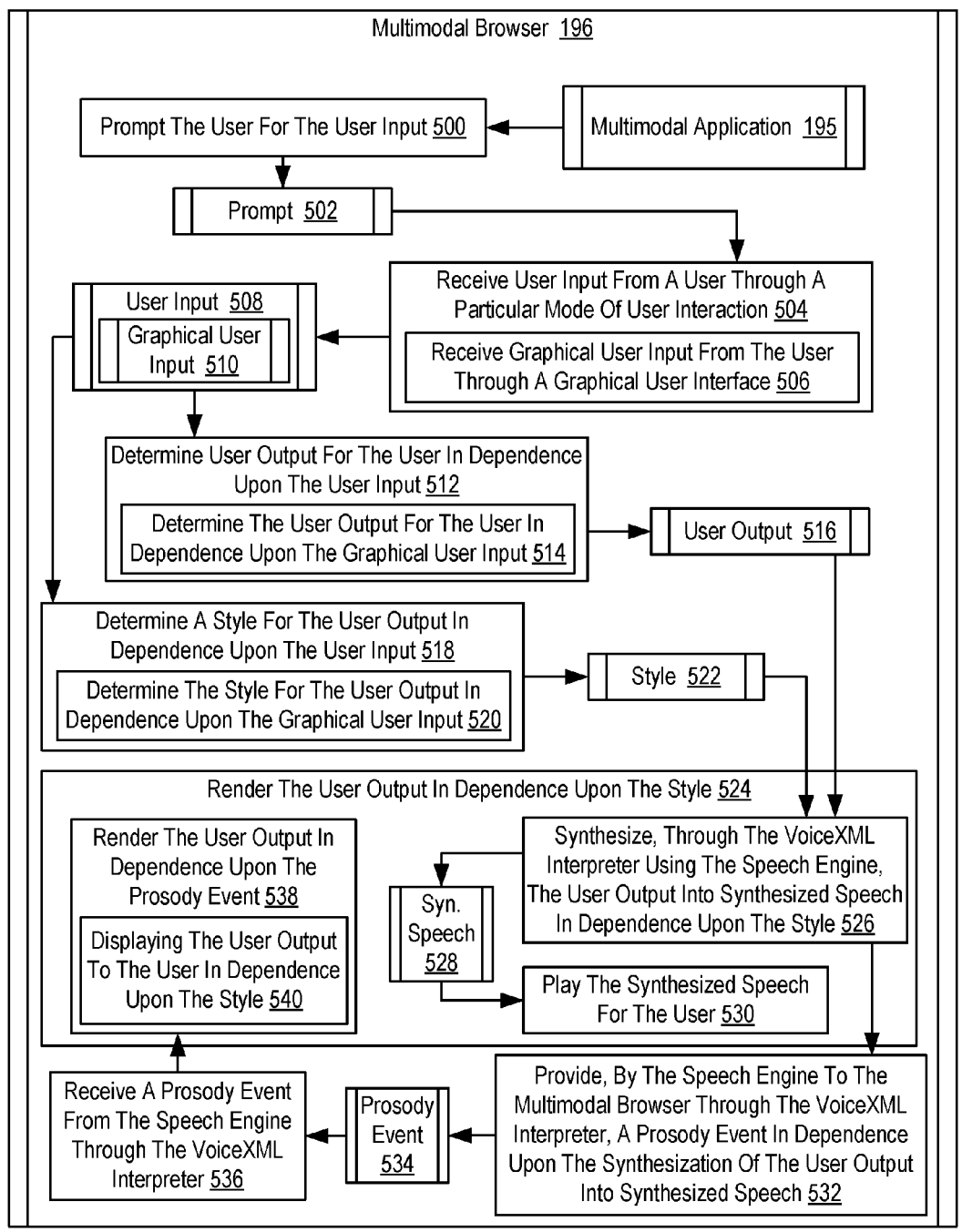
FIG. 5 sets forth a flow chart illustrating an exemplary method of providing expressive user interaction with a multimodal application according to embodiments of the present invention.

For further explanation, FIG. 5 sets forth a flow chart illustrating an exemplary method of providing expressive user interaction with a multimodal application according to embodiments of the present invention. Providing expressive user interaction with a multimodal application in this example is implemented with a multimodal application (195). The multimodal application (195) operates in a multimodal browser (196) on a multimodal device supporting multiple modes of interaction including a voice mode and one or more non-voice modes of user interaction with the multimodal application. The voice mode may be implemented in this example with audio output through a speaker and audio input through a microphone. Non-voice modes may be implemented by user input devices such as, for example, a keyboard and a mouse.

The multimodal application (195) is operatively coupled to a speech engine through a VoiceXML interpreter. The operative coupling provides a data communications path from the multimodal application (195) to the speech engine for grammars, speech for recognition, and other input. The operative coupling also provides a data communications path from the speech engine to the multimodal application (195) for recognized speech, semantic interpretation results, and other results. The operative coupling may be effected with a VoiceXML interpreter (192 on FIG. 4) when the multimodal application is implemented in a thick client architecture. When the multimodal application is implemented in a thin client architecture, the operative coupling may include a voice services module (130 on FIG. 3), a VOIP connection (216 on FIG. 3), and a VoiceXML interpreter (192 on FIG. 3).

The method of FIG. 5 includes prompting (500), by the multimodal browser (196), the user for the user input (508). The user input (508) of FIG. 5 represents information received by the multimodal application (195) from a user. The user input (508) in the example of FIG. 5 is implemented as graphical user input (510) received through a graphical user interface ('GUI'). In other embodiments, however, the user input (508) may be implemented as a voice utterance received through a microphone. The multimodal browser (196) may prompt (500) the user for the user input (508) according to the method of FIG. 5 by displaying a visual representation of a prompt (502) on a GUI to visually cue the user for input or by playing a voice representation of the prompt (502) through a speaker to aurally cue the user for input. The prompt (502) represents information presented to a user in a particular mode of user interaction, such as for example visual or voice, to solicit the user input (508) from the user. For further explanation, consider the following segment of an exemplary multimodal application:

```
<html xmlns="http://www.w3.org/1999/xhtml"
xmlns:vxml="http://www.w3.org/2001/vxml"
xmlns:ev="http://www.w3.org/2001/xml-events"
xmlns:xv="http://www.voicexml.org/2002/xhtml+voice"
xml:lang="en-US">
<head>
    <vxml:form id="vforml">
        <vxml:field name="question">
            <vxml:prompt src="#pl"/>
            <grammar>
                ...
            </grammar>
            ...
        </vxml:field>
    </vxml:form>
    ...
</head>
<body ev:event="load" ev:handler="#vforml">
    <form>
        <p id="pl">Please rate your experience with our product.</p>
        <input type="radio" name="exp" onclick="next(1)"/>
            Excellent<BR>
        <input type="radio" name="exp" onclick="next(2)"/>
            Ok<BR>
        <input type="radio" name="exp" onclick="next(3)"/>
            Terrible<BR>
        <p id="p2"/>
    </form>
</body>
</html>
```

The exemplary multimodal application segment above instructs a multimodal browser to prompt a user for user input both visually and aurally. Using the HTML <p> element, the exemplary multimodal application instructs the multimodal browser to display a visual representation of the prompt "Please rate your experience with our product" on a GUI to visually cue the user for input. Using the VoiceXML <prompt> element, the exemplary multimodal application also instructs the multimodal browser to play an audio representation of the prompt "Please rate your experience with our product" through a speaker to aurally cue to user for input.

To generate a voice representation of the prompt (502), the multimodal browser (196) passes the textual representation of the prompt (502) to a speech engine using calls to a VoiceXML interpreter API. The speech engine and the VoiceXML interpreter return synthesized speech corresponding to the textual representation of the prompt (502) to the multimodal browser (196). The synthesized speech returned from the speech engine is the voice representation of the prompt (502), which the multimodal browser (196) then plays to the user through a speaker of the multimodal device.

The method of FIG. 5 includes receiving (504), by the multimodal browser (196), user input (508) from a user through a particular mode of user interaction. A particular mode of user interaction may be a visual mode of user interaction such as, for example, using a GUI, or may be a voice mode of user interaction such as, for example, using a speaker and a microphone. In the method of FIG. 5, the multimodal browser (196) receives (504) user input (508) from a user by receiving (506) graphical user input (510) from the user through a graphical user interface. The multimodal browser (196) may receive (506) graphical user input (510) from the user through a GUI according to the method of FIG. 5 by providing the user with GUI components to access and manipulate such as, for example, text input fields, check boxes, radio buttons, and so on. For example, consider again, a segment of the exemplary multimodal application above:

```
<body ev:event="load" ev:handler="#vforml">
    <form>
        <p id="pl">Please rate your experience with our product.</p>
        <input type="radio" name="exp" onclick="next(1)"/>
            Excellent<BR>
        <input type="radio" name="exp" onclick="next(2)"/>
            Ok<BR>
        <input type="radio" name="exp" onclick="next(3)"/>
            Terrible<BR>
        <p id="p2"/>
    </form>
</body>
```

The exemplary multimodal segment above instructs a multimodal browser to provide the user with three radio buttons on a graphical user interface to receive user input in response to the prompt "Please rate your experience with our product." The first radio button is labeled 'Excellent.' The second radio button is labeled 'Ok.' The third radio button is labeled 'Terrible.' Through a user's selection of one of these radio buttons, the multimodal browser may receive graphical user input from the user.

The method of FIG. 5 also includes determining (512), by the multimodal browser (196), user output (516) for the user in dependence upon the user input (508). The user output (516) of FIG. 5 represents information provided to the user in response to the user's input (508). The multimodal browser (196) determines (512) user output (516) for the user according to the method of FIG. 5 by determining (514) the user output (516) for the user in dependence upon the graphical user input (510). Determining (514) the user output (516) for the user in dependence upon the graphical user input (510) according to the method of FIG. 5 may be carried out by executing an ECMAScript script that generates user output based on the graphical user input (510) provided by the user. For further explanation, consider another segment of the exemplary multimodal application above:

```
<html xmlns="http://www.w3.org/1999/xhtml"
xmlns:vxml="http://www.w3.org/2001/vxml"
xmlns:ev="http://www.w3.org/2001/xml-events"
xmlns:xv="http://www.voicexml.org/2002/xhtml+voice"
xml:lang="en-US">
<head>
    <vxml:form id="vforml">
        ...
    </vxml:form>
    ...
    <script type="text/javascript">
        ...
        function next(choice)
        {
            var paragraph = document.getElementById("#p2");
```

-continued

```
        var textNode;
        if (choice == 1 || choice == 2)
        {
            textNode =
                document.createTextNode("Thank you
                    for your business!");
            paragraph.style = "emotion: happy"
        }
        if (choice == 3)
        {
            textNode =
                document.createTextNode("I'm sorry. I'll
                    get a live operator to talk to you.";
            paragraph.style = "emotion: sad; color: red"
        }
        paragraph.appendChild(textNode);
        var e = document.createEvent("UIEvents");
        e.initEvent("DOMActivate","true","true");
        document.getElementById('vform2').dispatchEvent(e);
    }
    </script>
    ...
</head>
<body ev:event="load" ev:handler="#vform1">
    <form>
        <p id="p1">Please rate your experience with our product.</p>
        <input type="radio" name="exp" onclick="next(1)"/>
            Excellent<BR>
        <input type="radio" name="exp" onclick="next(2)"/>
            Ok<BR>
        <input type="radio" name="exp" onclick="next(3)"/>
            Terrible<BR>
        <p id="p2"/>
    </form>
</body>
</html>
```

The exemplary multimodal application segment above instructs a multimodal browser to execute ECMAScript script implementing a function 'next' when the multimodal browser receives graphical user input indicating a user's selection of one of the radio buttons. Each radio button is associated with a different numeric parameter that is provided to the 'next' function. When the user selects the 'Excellent' radio button, the multimodal browser executes the 'next' function with a parameter value of '1,' which generates user output "Thank you for your business!" When the user selects the 'Ok' radio button, the multimodal browser executes the 'next' function with a parameter value of '2,' which also generates user output "Thank you for your business!" When the user selects the 'Terrible' radio button, the multimodal browser executes the 'next' function with a parameter value of '3,' which generates user output "I'm sorry. I'll get a live operator to talk to you." In such a manner, the multimodal browser may determine the user output for the user based on the graphical user input.

The method of FIG. 5 includes determining (518), by the multimodal browser (196), a style (522) for the user output (516) in dependence upon the user input (508). The style (522) of FIG. 5 specifies expressive output characteristics for various modes of user interaction, including at least one other mode of user interaction than the mode by which the multimodal browser (196) received the user input (508). For example, if the multimodal browser (196) received the user input (508) through a visual mode of user interaction, then the style (522) may specify expressive output characteristics for a voice mode of user interaction along with the visual mode of user interaction. Similarly, if the multimodal browser (196) received the user input (508) through a voice mode of user interaction, then the style (522) may specify expressive output characteristics for a visual mode of user interaction along with the voice mode of user interaction. The expressive output characteristics define the manner in which the user output (508) is provided to a user for a particular mode of user interaction. For example, when the mode of user interaction is visual, expressive output characteristics may define that text displayed on a GUI is to be displayed using bold, red lettering to indicate frustration at a wrong answer or that a face displayed on a GUI should be rendered with a smile to indicate satisfactory input. When the mode of user interaction is voice, expressive output characteristics may define that synthesized speech prompts increase in volume with each syllable to indicate frustration at a wrong answer or that synthesized speech prompts are rendered using a deep male voice in an effort to sooth the user.

In the example of FIG. 5, the style (522) specifies prosody for the voice mode of user interaction and the visual characteristics for a visual mode of user interaction. Prosody generally refers to the characteristics of user output implemented as synthesized speech. Prosody may include the intonation, rhythm, syllable length, and focus of the synthesized speech. Acoustically, prosody describes changes in the syllable length, loudness, pitch, and certain details of the formant structure of speech sounds. With regard to speech articulators, prosody describes changes in the velocity and range of motion in articulators like the jaw and tongue, along with quantities like the air pressure in the trachea and the tensions in the laryngeal muscles. Phonologically, prosody is described by tone, intonation, rhythm, and lexical stress.

The manner in which the style (522) of FIG. 5 is specified will vary among the modes of user interaction for which the style specifies expressive output characteristics. When specifying expressive output characteristics for a visual mode of user interaction, the style may be specified using Dynamic HTML technologies including static markup languages such as HTML, a client-side scripting language such as JavaScript, a presentation definition language such as Cascading Style Sheets ('CSS'), and a Document Object Model. When specifying expressive output characteristics for a voice mode of user interaction, the style may, for example, be specified using extensions to a Speech Synthesis Markup Language ('SSML') described in and incorporated herein by reference: E. EIDE ET AL., MULTILAYERED EXTENSIONS TO THE SPEECH SYNTHESIS MARKUP LANGUAGE FOR DESCRIBING EXPRESSIVENESS, PROCEEDINGS OF THE 8TH EUROPEAN CONFERENCE ON SPEECH COMMUNICATION AND TECHNOLOGY, GENEVA, SWITZERLAND, Sep. 1-4, 2003. Dynamic HTML technologies, such as CSS, and extensions to SSML, such as those describe in EIDE, advantageously allow an author of a multimodal application to enhance each mode of user interaction with expressive output characteristics using human-level concepts such as, for example, attitude, emotion, proximity, and so on—as opposed to application-level concepts such as font, color, graphic, and so on or as opposed to speech synthesis-level concepts such as waveform, frequency, amplitude, and so on. For example, an author may use Dynamic HTML technologies to correspond the human-level emotion of 'sad' with particular visual attributes such as font, color, graphics, animations, and the like for user output on a GUI. Similarly, an author may use extension to SSML to correspond the human-level emotion of 'anger' with particular voice attributes such as increasing volume levels for each syllable in the user output played through a speaker.

Determining (518), by the multimodal browser (196), a style (522) for the user output (516) in dependence upon the user input (508) according to the method of FIG. 5 includes determining (520) the style (522) for the user output (516) in dependence upon the graphical user input (510). The multimodal browser (196) may determine (520) the style (522) for the user output (516) in dependence upon the graphical user input (510) according to the method of FIG. 5 by executing an ECMAScript script that assigns the style (522) to the user output (516) in the Document Object Model ('DOM') representing the multimodal application. For further explanation, consider again the segment of the exemplary multimodal application above:

```
<html xmlns="http://www.w3.org/1999/xhtml"
xmlns:vxml="http://www.w3.org/2001/vxml"
xmlns:ev="http://www.w3.org/2001/xml-events"
xmlns:xv="http://www.voicexml.org/2002/xhtml+voice"
xml:lang="en-US">
<head>
    <vxml:form id="vform1">
        ...
    </vxml:form>
    <vxml:form id="vform2">
        ...
    </vxml:form>
    <script type="text/javascript">
        function next(choice)
        {
            var paragraph = document.getElementById("#p2");
            var textNode;
            if (choice == 1 || choice == 2)
            {
                textNode =
                    document.createTextNode("Thank you
                    for your business!");
                paragraph.style = "emotion: happy"
            }
            if (choice == 3)
            {
                textNode =
                    document.createTextNode("I'm sorry. I'll
                    get a live operator to talk to you.";
                paragraph.style = "emotion: sad; color: red"
            }
            paragraph.appendChild(textNode);
            var e = document.createEvent("UIEvents");
            e.initEvent("DOMActivate","true","true");
            document.getElementById('vform2').dispatchEvent(e);
        }
    </script>
    ...
</head>
<body ev:event="load" ev:handler="#vform1">
    <form>
        <p id="p1">Please rate your experience with our product.</p>
        <input type="radio" name="exp" onclick="next(1)"/>
            Excellent<BR>
        <input type="radio" name="exp" onclick="next(2)"/>
            Ok<BR>
        <input type="radio" name="exp" onclick="next(3)"/>
            Terrible<BR>
        <p id="p2"/>
    </form>
</body>
</html>
```

The exemplary multimodal application segment above instructs a multimodal browser to execute ECMAScript script implementing a function 'next' when the multimodal browser receives graphical user input indicating a user selection of one of the radio buttons. Each radio button is associated with a different numeric parameter provided to the 'next' function. When the user selects the 'Excellent' radio button, the multimodal browser executes the 'next' function with a parameter value of '1,' which assigns the style 'emotion: happy' to the user output "Thank you for your business!" When the user selects the 'Ok' radio button, the multimodal browser executes the 'next' function with a parameter value of '2,' which also assigns the style 'emotion: happy' to the user output "Thank you for your business!" When the user selects the 'Terrible' radio button, the multimodal browser executes the 'next' function with a parameter value of '3,' which assigns the style 'emotion: sad; color: red' to the user output "I'm sorry. I'll get a live operator to talk to you." In such a manner, the multimodal browser may determine the style for the user output based on the graphical user input. The manner in which the style 'emotion: happy' and the style 'emotion: sad; color: red' affect the rendering of the user output will vary depending on the expressive output characteristics applied to each style using dynamic HTML technologies, such as CSS, and extensions to SSML, such as those describe in EIDE.

The method of FIG. 5 also includes rendering (524), by the multimodal browser (196), the user output (516) in dependence upon the style (522). The multimodal browser (196) renders (524) the user output (516) according to the method of FIG. 5 by synthesizing (526), through the VoiceXML interpreter using the speech engine, the user output (516) into synthesized speech (528) in dependence upon the style (522) and playing (530) the synthesized speech (528) for the user. The synthesized speech (528) of FIG. 5 is digitized speech representing the user output (516) expressed according to the style (522) specified by the multimodal application for the voice mode of user interaction. The multimodal browser (196) may synthesize (526) the user output (516) into synthesized speech (528) according to the method of FIG. 5 by passing the user output (516) along with the style (522) to a speech engine and receiving, in return, synthesized speech (528) for playback through a speaker of the multimodal device.

To activate synthesizing (526) the user output (516) into synthesized speech (528), the end of the exemplary 'next' function above includes the statement "document.getElementById('vform2'). dispatchEvent(e)." The exemplary statement instructs the multimodal browser to process the following VoiceXML dialog using the VoiceXML interpreter:

```
<vxml:form id="vform2">
    <vxml:block>
        <vxml:prompt src="#p2"/>
    </vxml:block>
</vxml:form>
```

The exemplary dialog above prompts a user with the user output generated by the exemplary 'next' function above according to the style specified by the exemplary 'next' function above.

Rendering (524), by the multimodal browser (196), the user output (516) in dependence upon the style (522) according to the method of FIG. 5 also includes displaying (540) the user output (516) to the user in dependence upon the style (522). The multimodal browser (196) may display (540) the user output (516) to the user according to the method of FIG. 5 by rendering the user output (516) on a GUI according to the style (522) specified by the multimodal application for the visual mode of user interaction.

Readers will note that the method of FIG. 5 renders the user output (516) according to the style (522) specified by the multimodal application in both visual and voice modes of user interaction. To synchronize rendering the user output (516) according to the style (522) in both modes, the example of FIG. 5 includes a prosody event (534). The prosody event (534) of FIG. 5 represents an event that is triggered by the speech engine each time the speech engine synthesizes speech using a new prosody as specified by a particular style (522).

The method of FIG. 5 includes providing (532), by the speech engine to the multimodal browser (196) through the VoiceXML interpreter, the prosody event (534) in dependence upon the synthesization (526) of the user output (516) into synthesized speech (528). The speech engine may provide (532) the prosody event (534) to the multimodal browser (196) through the VoiceXML interpreter according to the method of FIG. 5 by generating the prosody event (534) that contains the details of the prosody specified by the style (522) and passing the prosody event (534) to the multimodal browser (196) through a VoiceXML interpreter. Before passing the prosody event (534) along to the multimodal browser (196), the VoiceXML interpreter may transform the prosody event (534) into a DOM event according to the DOM Events specification or an XML event according to the XML Events specification. For example, consider the following exemplary DOM Events interface for a prosody event:

```
interface ProsodyEvent : Event {
    readonly attribute views::AbstractView view;
    readonly attribute string detail;
    void initProsodyEvent(in DOMString typeArg,
        in boolean canBubbleArg,
        in boolean cancelableArg,
        in views::AbstractView viewArg,
        in string detailArg);
};
```

The VoiceXML interpreter, upon receiving a prosody event from a speech engine, may transform the prosody event into a DOM Event with the exemplary interface above. Using the exemplary DOM Events interface above, the multimodal browser (196) may access the prosody event (534) provided by a speech engine. The 'detail' string contains attribute value pairs for prosody such as, for example, 'emotion="calm",' 'attitude="confident",' and 'proximity="close".' As mentioned above, the manner in which these attribute value pairs affect the rendering of the user output will depend on rendering definitions supplied using dynamic HTML such as, for example CSS, and extensions to the SSML such as, for example, those extension described in EIDE.

The method of FIG. 5 also includes receiving (536), by the multimodal browser (196) through the VoiceXML interpreter, a prosody event (534) from the speech engine. The multimodal browser (536) receives (536) the prosody event (534) from the speech engine through a VoiceXML interpreter and accesses the prosody event (534) in the DOM Events model using, for example, the exemplary interface described above.

Rendering (524), by the multimodal browser (196), the user output (516) in dependence upon the style (522) according to the method of FIG. 5 includes rendering (538) the user output (516) in dependence upon the prosody event (534). In the method of FIG. 5, rendering (538) the user output (516) in dependence upon the prosody event (534) includes displaying (540) the user output (516) to the user in dependence upon the style (522). As discussed above, the multimodal browser (196) may display (540) the user output to the user according to the method of FIG. 5 by rendering the user output (516) on a GUI according to the style (522) specified by the multimodal application for the visual mode of user interaction. In such an example, therefore, the multimodal browser (196) does not display the user output (516) on a graphical user interface according to the style (522) until the multimodal browser (196) receives the prosody event.

The multimodal browser (196) may render (538) the user output (516) in dependence upon the prosody event (534) to display (540) the user output (516) in dependence upon the style (522) according to the method of FIG. 5 by executing an ECMAScript script that modifies visual characteristics of the user output (516) for a visual mode of user interaction. Consider, for example, the following exemplary ECMAScript script:

```
<script type="text/javascript" ev:event="prosody">
    function Attribute(name, value) { this.name=name;
    this.value=value; }
    function attributesFromString(input, ouptut)
        {/* Parses the prosody event detail into an array of attribute
        objects */}
    var attributes = new Array( );
    attributesFromString(event.detail, attributes);
    for (i in attributes)
        {
        if attributes [i] .name.match("emotion")
            {/* Process value for emotion value*/}
        if attributes[i].name.match("attitude")
            {/* Process value for attitude value*/}
        if attributes[i].name.match("proximity")
            {/* Process value for proximity value*/}
        ...
        }
</script>
```

The exemplary ECMAScript script above executes when the multimodal browser (196) receives a prosody event identified as 'prosody.' Readers will recall from the exemplary prosody event interface above that the prosody event includes a 'detail' field that contains attribute value pairs for prosody such as, for example, 'emotion="calm",' 'attitude="confident",' and 'proximity="close".' In the exemplary ECMAScript script above, the 'attributesFromString' function parses the prosody event detail into an array of attribute objects. The exemplary ECMAScript script above provides computer program instructions for processing values for each type of prosody attribute that may be contained in a prosody event such as, for example, 'emotion,' 'attitude,' and 'proximity.' Therefore, when the multimodal browser receives a prosody event from the speech engine, which indicates that the speech engine has synthesized speech using the prosody specified by the style, the multimodal browser may modify the visual representation of the user output to correspond with the prosody used to generate synthesized speech from the user output. In such a manner, the prosody event advantageously allows the multimodal browser to synchronize rendering the user output according to the style in both a visual mode of user interaction and a voice mode of user interaction.

As mentioned above, a multimodal browser may receive user input from a user by receiving graphical user input through a graphical user interface. A multimodal browser may, however, receive user input from a user by receiving a voice utterance. For further explanation, therefore, FIG. 6 sets forth a flow chart illustrating a further exemplary method of providing expressive user interaction with a multimodal application according to embodiments of the present invention that includes receiving (600) a voice utterance (602) from the user. Providing expressive user interaction with a multimodal application in this example is implemented with a multimodal application (195). The multimodal application (195) operates in a multimodal browser (196) on a multimodal device supporting multiple modes of interaction including a voice mode and one or more non-voice modes of user interaction with the multimodal application. The voice mode may be implemented in this example with audio output through a speaker and audio input through a microphone. Non-voice modes may be implemented by user input devices such as, for example, a keyboard and a mouse.

The multimodal application (195) is operatively coupled to a speech engine through a VoiceXML interpreter. The operative coupling provides a data communications path from the multimodal application (195) to the speech engine for grammars, speech for recognition, and other input. The operative coupling also provides a data communications path from the speech engine to the multimodal application (195) for recognized speech, semantic interpretation results, and other results. The operative coupling may be effected with a VoiceXML interpreter (192 on FIG. 4) when the multimodal application is implemented in a thick client architecture. When the multimodal application is implemented in a thin client architecture, the operative coupling may include a voice services module (130 on FIG. 3), a VOIP connection (216 on FIG. 3), and a VoiceXML interpreter (192 on FIG. 3).

Figure 6:
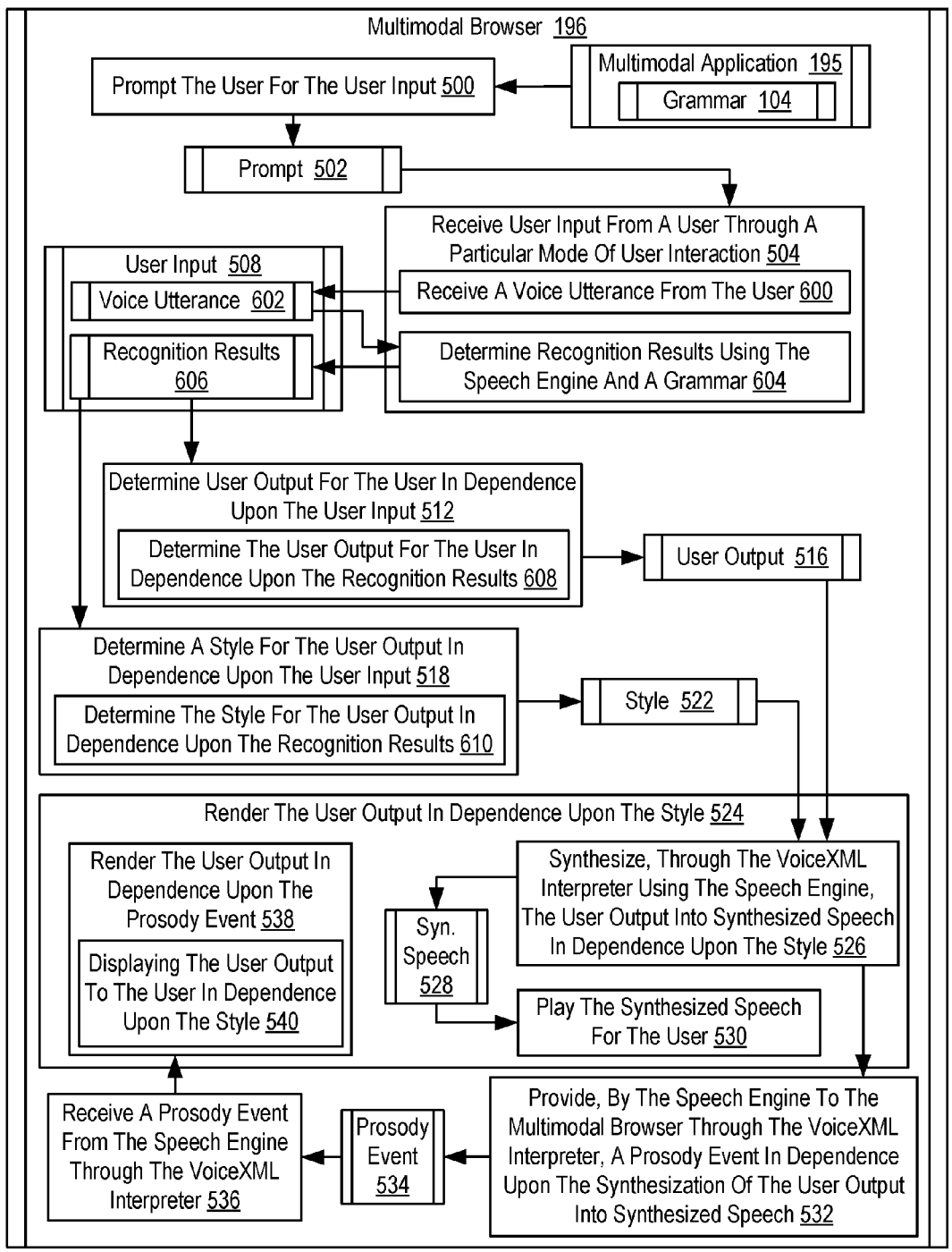
FIG. 6 sets forth a flow chart illustrating a further exemplary method of providing expressive user interaction with a multimodal application according to embodiments of the present invention.

The method of FIG. 6 is similar to the method of FIG. 5. That is, the method of FIG. 6 includes prompting (500), by the multimodal browser (196), the user for the user input (508); receiving (504), by the multimodal browser (196), user input (508) from a user through a particular mode of user interaction; determining (512), by the multimodal browser (196), user output (516) for the user in dependence upon the user input (508); determining (518), by the multimodal browser (196), a style (522) for the user output (516) in dependence upon the user input (508), the style (522) specifying expressive output characteristics for at least one other mode of user interaction; and rendering (524), by the multimodal browser (196), the user output (516) in dependence upon the style (522). Similar to the example of FIG. 5, the multimodal browser (196) in the example of FIG. 6 prompts (500) the user for user input (508) using a prompt (502) that may be rendered to the user using both visual and voice modes of user interactions as described above.

The method of FIG. 6 differs from the method of FIG. 5 in that receiving (504), by the multimodal browser (196), user input (508) from a user through a particular mode of user interaction includes receiving (600) a voice utterance (602) from the user. The voice utterance (602) of FIG. 6 represents digitized human speech provided to the multimodal browser (196) by a user of a multimodal device. As mentioned above, the multimodal browser (196) may acquire the voice utterance (602) from a user through a microphone and encode the voice utterance in a suitable format for storage and transmission using any CODEC as will occur to those of skill in the art.

Receiving (504), by the multimodal browser (196), user input (508) from a user through a particular mode of user interaction according to the method of FIG. 6 also includes determining (604) recognition results (606) using the speech engine and a grammar (104). The recognition results (606) of FIG. 6 represent output returned from a speech engine based on the voice utterance (602). The multimodal browser (196) may determine (604) recognition results (606) using the speech engine and a grammar (104) according to the method of FIG. 6 by passing the voice utterance (602) and the grammar (104) specified in the multimodal application (196) to a speech engine for speech recognition through a VoiceXML interpreter, and receiving, in return, the recognition results (606) from the speech engine as values stored in an ECMAScript data structure such as, for example, the application variable array 'application.lastresult$' some other field variable array for a VoiceXML field specified by the multimodal application (195). ECMAScript data structures represent objects in the Document Object Model ('DOM') at the scripting level in an X+V page of a multimodal application (195).

In a thin client architecture, the multimodal browser (196) may pass the voice utterance (602) and the grammar (104) to a speech engine for speech recognition through a VoiceXML interpreter according the method of FIG. 6 as part of a call by the multimodal browser (196) to a voice services module (130 on FIG. 3) to provide voice recognition services. The voice services module, then in turn, passes the voice utterance (602) and the grammar (104) to the VoiceXML interpreter (192) through a VOIP connection (216 on FIG. 3) and a voice server application (188 on FIG. 3), which in turn, passes the voice utterance (602) and the grammar (104) to a speech engine for recognition. In a thick client architecture, the multimodal browser (196) may pass the voice utterance (602) and the grammar (104) to a speech engine for speech recognition through a VoiceXML interpreter according to the method of FIG. 6 as part of a call directly to an embedded VoiceXML interpreter (192) by the multimodal browser (196) through an API exposed by the VoiceXML interpreter (192).

As mentioned above, the multimodal browser (196) may receive, in return, the recognition results (606) from the speech engine as values stored in an ECMAScript data structure such as, for example, the application variable array 'application.lastresult$' some other field variable array for a VoiceXML field specified by the multimodal application (195). The 'application.lastresult$' array holds information about the last recognition generated by a speech engine for the VoiceXML interpreter (192). The 'application.lastresult$' is an array of elements where each element, application.lastresult$[i], represents a possible result through the following shadow variables:

application.lastresult$[i].confidence, which specifies the confidence level for this recognition result. A value of 0.0 indicates minimum confidence, and a value of 1.0 indicates maximum confidence.

application.lastresult$[i].utterance, which is the raw string of words that compose this recognition result. The exact tokenization and spelling is platform-specific (e.g. "five hundred thirty" or "5 hundred 30" or even "530").

application.lastresult$[i].inputmode, which specifies the mode in which the user provided the voice utterance. Typically, the value is voice for a voice utterance.

application.lastresult$[i].interpretation, which is an ECMAScript variable containing output from ECMAScript post-processing script typically used to reformat the value contained in the 'utterance' shadow variable.

When the multimodal browser (196) receives the recognition results (606) in an ECMAScript field variable array for a field specified in the multimodal application (195), the recognition results (606) may be stored in field variable array using shadow variables similar to the application variable 'application.lastresult$.' For example, a field variable array may represent a possible recognition result through the following shadow variables:

name$[i].confidence,
    name$[i].utterance,
    name$[i].inputmode, and
    name$[i].interpretation, where 'name$' is a placeholder for the field identifier for a VoiceXML field in the multimodal application (195) specified to store the results of the recognition results (606).

In the method of FIG. 6, determining (512), by the multimodal browser (196), user output (516) for the user in dependence upon the user input (508) includes determining (608) the user output (516) for the user in dependence upon the recognition results (606). The multimodal browser (196) may determine (608) the user output (516) for the user in dependence upon the recognition results (606) according to the method of FIG. 6 by executing an ECMAScript script that generates user output based on the recognition results (606) provided by a speech engine. For further explanation, consider another segment of the exemplary multimodal application above:

```
<html xmlns="http://www.w3.org/1999/xhtml"
xmlns:vxml="http://www.w3.org/2001/vxml"
xmlns:ev="http://www.w3.org/2001/xml-events"
xmlns:xv="http://www.voicexml.org/2002/xhtml+voice"
xml:lang="en-US">
<head>
    <vxml:form id="vform1">
        <vxml:field name="user input">
            <vxml:prompt src="#p1"/>
            <grammar>
                <![CDATA[
                    #JSGF V1.0;
                    grammar questionaire;
                    public <questionaire> =
                        ([I had] [a | an] <rating> [experience])
                        {$=$rating};
                    <rating> = excellent {$=1} | ok {$=2} | terrible {$=3};
                ]]>
            </vxml:grammar>
            <vxml:filled>
                <vxml:assign name="temp" expr="nextForm( )"/>
            </vxml:filled>
        </vxml:field>
    </vxml:form>
    ...
    <script type="text/javascript">
        function nextForm( )
        {
            next(application.lastresult$);
        }
        function next(choice)
        {
            var paragraph = document.getElementById("#p2");
            var textNode;
            if (choice == 1 || choice == 2)
            {
                textNode =
                    document.createTextNode("Thank you
                    for your business!");
                paragraph.style = "emotion: happy"
            }
            if (choice == 3)
            {
                textNode =
                    document.createTextNode("I'm sorry. I'll
                    get a live operator to talk to you.";
                paragraph.style = "emotion: sad; color: red"
            }
            paragraph.appendChild(textNode);
            var e = document.createEvent("UIEvents");
            e.initEvent("DOMActivate","true","true");
            document.getElementById('vform2').dispatchEvent(e);
        }
    </script>
    ...
</head>
...
</html>
```

The exemplary multimodal application segment above instructs a multimodal browser to execute an ECMAScript script implementing a function 'nextForm' when the multimodal browser receives recognition results for the VoiceXML field 'user input' of the VoiceXML form 'vform1' Using the semantic interpretation scripts in the <rating> grammar rule, the recognition results are assigned a value of '1' if the voice utterance contains the word 'excellent.' The recognition results are assigned a value of '2' if the voice utterance contains the word 'ok.' The recognition results are assigned a value of '3' if the voice utterance contains the word 'terrible.' Readers will recall that the recognition results may be stored in the 'application.lastresult$' variable.

In the exemplary multimodal application segment above, the 'nextForm' function calls the 'next' function using the recognition results received by the multimodal browser from the speech engine as a parameter. When the recognition results are assigned a value of '1,' then the 'next' function generates user output "Thank you for your business!" When the recognition results are assigned a value of '2,' then the 'next' function also generates user output "Thank you for your business!" When the recognition results are assigned a value of '3,' then the 'next' function generates user output "I'm sorry. I'll get a live operator to talk to you." In such a manner, the multimodal browser may determine the user output for the user based on the recognition results.

To further understand how the ECMAScript script implementing the 'nextForm' function is executed when the multimodal browser receives recognition results for the VoiceXML field 'user input' of the VoiceXML form 'vform1,' readers will note that the function call for the 'nextForm' function is contained in a VoiceXML <filled> element, which is in turn contained in VoiceXML <field> element. The exemplary <filled> element above is only executed when the parent <field> element is filled with a value. For example, the exemplary <filled> element above is only executed when the 'user input' field of the 'vform1' dialog is filled with a value from the recognition result 'application.lastresult$.' Upon executing the exemplary <filled> element, the 'nextForm' function is executed.

Determining (518), by the multimodal browser (196), a style (522) for the user output (516) in dependence upon the user input (508) according to the method of FIG. 6 includes determining (610) the style (522) for the user output (516) in dependence upon the recognition results (606). The multimodal browser (196) may determine (610) the style (522) for the user output (516) in dependence upon the recognition results (606) according to the method of FIG. 6 by executing an ECMAScript script that assigns the style (522) to the user output (516) in the Document Object Model ('DOM') representing the multimodal application. For further explanation, consider another segment of the exemplary multimodal application above:

```
<html xmlns="http://www.w3.org/1999/xhtml"
xmlns:vxml="http://www.w3.org/2001/vxml"
xmlns:ev="http://www.w3.org/2001/xml-events"
xmlns:xv="http://www.voicexml.org/2002/xhtml+voice"
xml:lang="en-US">
<head>
    <vxml:form id="vform1">
        <vxml:field name="user input">
            <vxml:prompt src="#p1"/>
            <grammar>
                <![CDATA[
                    #JSGF V1.0;
                    grammar questionaire;
                    public <questionaire> =
                        ([I had] [a | an] <rating> [experience])
                        {$=$rating};
                    <rating> = excellent {$=1} | ok {$=2} | terrible {$=3};
                ]]>
            </vxml:grammar>
            <vxml:filled>
                <vxml:assign name="temp" expr="nextForm( )"/>
            </vxml:filled>
        </vxml:field>
    </vxml:form>
```

-continued

```
...
<script type="text/javascript">
    function nextForm( )
    {
        next(application.lastresult$);
    }
    function next(choice)
    {
        var paragraph = document.getElementByld("#p2");
        var textNode;
        if (choice == 1 || choice == 2)
        {
            textNode =
                document.createTextNode("Thank you
                for your business!");
            paragraph.style = "emotion: happy"
        }
        if (choice == 3)
        {
            textNode =
                document.createTextNode("I'm sorry. I'll
                get a live operator to talk to you.";
            paragraph.style = "emotion: sad; color: red"
        }
        paragraph.appendChild(textNode);
        var e = document.createEvent("UIEvents");
        e.initEvent("DOMActivate","true","true");
        document.getElementByld('vform2').dispatchEvent(e);
    }
</script>
...
</head>
...
</html>
```

The exemplary multimodal application segment above instructs a multimodal browser to execute an ECMAScript script implementing a function 'nextForm' when the multimodal browser receives recognition results for the VoiceXML field 'user input' of the VoiceXML form 'vform1.' Using the semantic interpretation scripts in the <rating> grammar rule as mentioned above, the recognition results are assigned a value of '1' if the voice utterance contains the word 'excellent.' The recognition results are assigned a value of '2' if the voice utterance contains the word 'ok.' The recognition results are assigned a value of '3' if the voice utterance contains the word 'terrible.' Readers will recall that the recognition results may be stored in the 'application.lastresult$' variable.

In the exemplary multimodal application segment above, the 'nextForm' function calls the 'next' function using the recognition results received by the multimodal browser from the speech engine as a parameter. When the recognition results are assigned a value of '1,' the 'next' function assigns the style 'emotion: happy' to the user output "Thank you for your business!" When the recognition results are assigned a value of '2,' the 'next' function also assigns the style 'emotion: happy' to the user output "Thank you for your business!" When the recognition results are assigned a value of '3,' however, the 'next' function assigns the style 'emotion: sad; color: red' to the user output "I'm sorry. I'll get a live operator to talk to you." In such a manner, the multimodal browser may determine the style for the user output based on the recognition results. The manner in which the style 'emotion: happy' and the style 'emotion: sad; color: red' affect the rendering of the user output will vary depending on the expressive output characteristics applied to each style using dynamic HTML technologies, such as CSS, and extensions to SSML, such as those describe in EIDE.

Readers will note that the remaining steps in the method of FIG. 6 operate in a manner similar to the method of FIG. 5. As mentioned above, the prosody event advantageously allows the multimodal browser to synchronize rendering the user output according to the style in both a visual mode of user interaction and a voice mode of user interaction.

Exemplary embodiments of the present invention are described largely in the context of a fully functional computer system for providing expressive user interaction with a multimodal application. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of providing expressive user interaction with a multimodal application, the multimodal application operating in a multimodal browser on a multimodal device supporting multiple modes of user interaction including a voice mode and one or more non-voice modes, the multimodal application operatively coupled to a speech engine through a VoiceXML interpreter, the method comprising:
   receiving, by the multimodal browser, user input from a user through a particular mode of user interaction;
   determining, by the multimodal browser, user output for the user in dependence upon the user input;
   determining, by the multimodal browser, a style for the user output in dependence upon the user input, the style specifying expressive output characteristics for at least one other mode of user interaction; and
   rendering, by the multimodal browser, the user output in dependence upon the style,
   wherein determining the style for the user output in dependence upon the user input comprises performing a determination distinct from determining the user output,
   wherein determining, by the multimodal browser, a style for the user output in dependence upon the user input comprises determining, by the multimodal browser, a style for the user output in dependence upon meaning of the user input.

2. The method of claim 1 further comprising prompting, by the multimodal browser, the user for the user input.

3. The method of claim 1 wherein:
receiving, by the multimodal browser, user input from the user through the particular mode of user interaction further comprises receiving graphical user input from the user through a graphical user interface;
determining, by the multimodal browser, user output for the user in dependence upon the user input further comprises determining the user output for the user in dependence upon the graphical user input; and
determining, by the multimodal browser, the style for the user output further comprises determining the style for the user output in dependence upon the graphical user input.

4. The method of claim 1 wherein:
receiving, by the multimodal browser, user input from the user through the particular mode of user interaction further comprises:
  receiving a voice utterance from the user, and
  determining recognition results using the speech engine and a grammar;
determining, by the multimodal browser, user output for the user in dependence upon the user input further comprises determining the user output for the user in dependence upon the recognition results; and
determining, by the multimodal browser, the style for the user output further comprises determining the style for the user output in dependence upon the recognition results.

5. The method of claim 1 wherein:
the style specifies prosody for the voice mode of user interaction; and
rendering, by the multimodal browser, the user output in dependence upon the style further comprises:
  synthesizing, through the VoiceXML interpreter using the speech engine, the user output into synthesized speech in dependence upon the style, and
  playing the synthesized speech for the user.

6. The method of claim 5 further comprising providing, by the speech engine to the multimodal browser through the VoiceXML interpreter, a prosody event in dependence upon the synthesizing of the user output into synthesized speech.

7. The method of claim 1 wherein:
the style specifies visual characteristics for a visual mode of user interaction; and
rendering, by the multimodal browser, the user output in dependence upon the style further comprises displaying the user output to the user in dependence upon the style.

8. The method of claim 7 further comprising receiving, by the multimodal browser through the VoiceXML interpreter, a prosody event from the speech engine, and wherein rendering, by the multimodal browser, the user output in dependence upon the style further comprises rendering the user output in dependence upon the prosody event.

9. Apparatus for providing expressive user interaction with a multimodal application, the multimodal application operating in a multimodal browser on a multimodal device supporting multiple modes of user interaction including a voice mode and one or more non-voice modes, the multimodal application operatively coupled to a speech engine through a VoiceXML interpreter, the apparatus comprising a computer processor and a computer memory operatively coupled to the computer processor, the computer memory having stored within it computer program instructions which, when executed by the computer processor, cause performance of a method comprising:
receiving, by the multimodal browser, user input from a user through a particular mode of user interaction;
determining, by the multimodal browser, user output for the user in dependence upon the user input;
determining, by the multimodal browser, a style for the user output in dependence upon the user input, the style specifying expressive output characteristics for at least one other mode of user interaction; and
rendering, by the multimodal browser, the user output in dependence upon the style,
wherein determining the style for the user output in dependence upon the user input comprises performing a determination distinct from determining the user output,
wherein determining, by the multimodal browser, a style for the user output in dependence upon the user input comprises determining, by the multimodal browser, a style for the user output in dependence upon meaning of the user input.

10. The apparatus of claim 9, wherein the computer memory also has stored within it computer program instructions which, when executed by the computer processor, cause prompting, by the multimodal browser, the user for the user input.

11. The apparatus of claim 9 wherein:
receiving, by the multimodal browser, user input from the user through the particular mode of user interaction further comprises receiving graphical user input from the user through a graphical user interface;
determining, by the multimodal browser, user output for the user in dependence upon the user input further comprises determining the user output for the user in dependence upon the graphical user input; and
determining, by the multimodal browser, the style for the user output further comprises determining the style for the user output in dependence upon the graphical user input.

12. The apparatus of claim 9 wherein:
receiving, by the multimodal browser, user input from the user through the particular mode of user interaction further comprises:
  receiving a voice utterance from the user, and
  determining recognition results using the speech engine and a grammar;
determining, by the multimodal browser, user output for the user in dependence upon the user input further comprises determining the user output for the user in dependence upon the recognition results; and
determining, by the multimodal browser, the style for the user output further comprises determining the style for the user output in dependence upon the recognition results.

13. The apparatus of claim 9 wherein:
the style specifies prosody for the voice mode of user interaction;
rendering, by the multimodal browser, the user output in dependence upon the style further comprises:
  synthesizing, through the VoiceXML interpreter using the speech engine, the user output into synthesized speech in dependence upon the style, and
  playing the synthesized speech for the user; and
the computer memory also has stored within it computer program instructions which, when executed by the computer processor, cause providing, by the speech engine to the multimodal browser through the VoiceXML interpreter, a prosody event in dependence upon the synthesizing of the user output into synthesized speech.

14. The apparatus of claim 9 wherein:
the style specifies visual characteristics for a visual mode of user interaction;

the computer memory also has stored within it computer program instructions which, when executed by the computer processor, cause receiving, by the multimodal browser through the VoiceXML interpreter, a prosody event from the speech engine; and rendering, by the multimodal browser, the user output in dependence upon the style further comprises displaying the user output to the user in dependence upon the style and rendering the user output in dependence upon the prosody event.

15. A computer-recordable device storing computer program instructions for providing expressive user interaction with a multimodal application, the multimodal application operating in a multimodal browser on a multimodal device supporting multiple modes of user interaction including a voice mode and one or more non-voice modes, the multimodal application operatively coupled to a speech engine through a VoiceXML interpreter, wherein the computer program instructions, when executed, cause performance of a method comprising:

receiving, by the multimodal browser, user input from a user through a particular mode of user interaction;

determining, by the multimodal browser, user output for the user in dependence upon the user input;

determining, by the multimodal browser, a style for the user output in dependence upon the user input, the style specifying expressive output characteristics for at least one other mode of user interaction; and rendering, by the multimodal browser, the user output in dependence upon the style, wherein determining the style for the user output in dependence upon the user input comprises performing a determination distinct from determining the user output, wherein determining, by the multimodal browser, a style for the user output in dependence upon the user input comprises determining, by the multimodal browser, a style for the user output in dependence upon meaning of the user input.

16. The computer-recordable device of claim 15, wherein the method further comprises prompting, by the multimodal browser, the user for the user input.

17. The computer-recordable device of claim 15 wherein:
receiving, by the multimodal browser, user input from the user through the particular mode of user interaction further comprises receiving graphical user input from the user through a graphical user interface;

determining, by the multimodal browser, user output for the user in dependence upon the user input further comprises determining the user output for the user in dependence upon the graphical user input; and determining, by the multimodal browser, the style for the user output further comprises determining the style for the user output in dependence upon the graphical user input.

18. The computer-recordable device of claim 15 wherein:
receiving, by the multimodal browser, user input from the user through the particular mode of user interaction further comprises:
receiving a voice utterance from the user, and
determining recognition results using the speech engine and a grammar;

determining, by the multimodal browser, user output for the user in dependence upon the user input further comprises determining the user output for the user in dependence upon the recognition results; and determining, by the multimodal browser, the style for the user output further comprises determining the style for the user output in dependence upon the recognition results.

19. The computer-recordable device of claim 15 wherein:
the style specifies prosody for the voice mode of user interaction;

rendering, by the multimodal browser, the user output in dependence upon the style further comprises:
synthesizing, through the VoiceXML interpreter using the speech engine, the user output into synthesized speech in dependence upon the style, and
playing the synthesized speech for the user; and the method further comprises providing, by the speech engine to the multimodal browser through the VoiceXML interpreter, a prosody event in dependence upon the synthesizing of the user output into synthesized speech.

20. The computer-recordable device of claim 15 wherein:
the style specifies visual characteristics for a visual mode of user interaction;

the method further comprising receiving, by the multimodal browser through the VoiceXML interpreter, a prosody event from the speech engine; and rendering, by the multimodal browser, the user output in dependence upon the style further comprises displaying the user output to the user in dependence upon the style and rendering the user output in dependence upon the prosody event.

* * * * *